United States Patent
Park

(10) Patent No.: US 9,723,295 B2
(45) Date of Patent: Aug. 1, 2017

(54) IMAGE PROCESSING DEVICE, IMAGE PROCESSING METHOD, IMAGE PROCESSING COMPUTER PROGRAM, AND INFORMATION RECORDING MEDIUM WHEREUPON IMAGE PROCESSING COMPUTER PROGRAM IS STORED

(71) Applicant: P2P BANK Co., Ltd., Tokyo (JP)

(72) Inventor: Tae-Hong Park, Tokyo (JP)

(73) Assignee: P2P BANK Co., Ltd. (JP)

( * ) Notice: Subject to any disclaimer, the term of this patent is extended or adjusted under 35 U.S.C. 154(b) by 146 days.

(21) Appl. No.: 14/827,714

(22) Filed: Aug. 17, 2015

(65) Prior Publication Data

US 2016/0100152 A1    Apr. 7, 2016

Related U.S. Application Data

(63) Continuation of application No. PCT/JP2014/000827, filed on Feb. 18, 2014.

(30) Foreign Application Priority Data

Feb. 18, 2013    (JP) .................................. 2013-028615

(51) Int. Cl.
*H04N 13/02*    (2006.01)
*G06T 19/00*    (2011.01)
(Continued)

(52) U.S. Cl.
CPC ............. *H04N 13/026* (2013.01); *G06T 7/10* (2017.01); *G06T 7/12* (2017.01); *G06T 7/174* (2017.01);
(Continued)

(58) Field of Classification Search
CPC .. G06T 19/00; G06T 7/10; G06T 7/12; G06T 7/174; G06T 7/194; G06T 7/579;
(Continued)

(56) References Cited

U.S. PATENT DOCUMENTS

2011/0243443 A1*    10/2011    Varekamp ................. G06T 7/12
                                                                          382/173
2011/0249886 A1    10/2011    Park et al.
(Continued)

FOREIGN PATENT DOCUMENTS

CN          102404594 A       4/2012
CN          102883174 A       1/2013
(Continued)

OTHER PUBLICATIONS

International Preliminary Report on Patentability enclosing the Written Opinion for PCT/JP2014/000827, issued on Aug. 18, 2015 (7 pages).
(Continued)

*Primary Examiner* — Edward Park
(74) *Attorney, Agent, or Firm* — Harness, Dickey & Pierce, P.L.C.

(57) ABSTRACT

An image processing apparatus includes an image-frame reading section that reads one or more image frames from a moving image, a region-boundary-line-information receiving section that receives information concerning a region boundary line in the read image frames, a region dividing section that expands a division region starting from a point on the region boundary line and divides the inside and outside of the region boundary line with division lines, which connect points of brightness, an opening processing section that leaves a first division line between a pair of the region boundary lines and opens a second division line, a separating section that separates regions in the image frames in units of a region surrounded by the first division line, and a first depth-value giving section that gives, to the region surrounded by the first division line, a depth value representing a distance degree of the region.

17 Claims, 14 Drawing Sheets

(51) Int. Cl.
*G06T 7/579* (2017.01)
*G06T 7/10* (2017.01)
*G06T 7/12* (2017.01)
*G06T 7/174* (2017.01)
*G06T 7/194* (2017.01)

(52) U.S. Cl.
CPC .............. *G06T 7/194* (2017.01); *G06T 7/579* (2017.01); *G06T 19/00* (2013.01); *H04N 13/0264* (2013.01); *G06T 2200/04* (2013.01); *G06T 2207/10016* (2013.01); *G06T 2207/10024* (2013.01); *G06T 2207/10028* (2013.01); *G06T 2207/20036* (2013.01); *G06T 2207/20096* (2013.01); *G06T 2207/20101* (2013.01); *G06T 2207/30196* (2013.01)

(58) Field of Classification Search
CPC ....... G06T 2200/04; G06T 2207/10016; G06T 2207/10024; G06T 2207/10028; G06T 2207/20036; G06T 2207/20096; G06T 2207/20101; G06T 2207/30196; H04N 13/026; H04N 13/0264
See application file for complete search history.

(56) References Cited

U.S. PATENT DOCUMENTS

2012/0287233 A1* 11/2012 Wang ................. H04N 13/0022
 348/42
2013/0286017 A1* 10/2013 Marimon Sanjuan .. G06T 15/00
 345/427

FOREIGN PATENT DOCUMENTS

JP  2008-277932 A  11/2008
JP  2011-223566 A  11/2011
WO  WO-2006-080239 A1  8/2006

OTHER PUBLICATIONS

Chinese Office Action regarding Chinese Patent Application No. 201480021836.8, issued Aug. 16, 2016; 10 pages.

* cited by examiner

IMAGE PROCESSING DEVICE, IMAGE PROCESSING METHOD, IMAGE PROCESSING COMPUTER PROGRAM, AND INFORMATION RECORDING MEDIUM WHEREUPON IMAGE PROCESSING COMPUTER PROGRAM IS STORED

CROSS-REFERENCE TO RELATED APPLICATION

This application is based upon and claims priority to Japanese Patent Application No. 2013-028615 filed in Japan on Feb. 18, 2013, the entire contents of which are incorporated in this specification. Contents described in patents, patent applications, and documents cited in this application are incorporated in this specification.

TECHNICAL FIELD

The present invention relates to an image processing apparatus, in particular, an apparatus for performing image processing used in converting a 2D video into a 3D video, an image processing method using the apparatus, a computer program for image processing executable by being read in the apparatus, and an information recording medium having the program stored therein.

BACKGROUND ART

In recent years, movies using 3D videos have been attracting attention. The 3D video makes use of binocular parallax that occurs because the human eyes are apart approximately 65 mm to the left and right and videos sensed by the left eye and the right eye are different. The left eye and the right eye of the human respectively view different 2D videos. Therefore, when these 2D videos are transmitted from the ganglion cells on the retina surfaces to the brain center through the optic nerve, the brain subjects these 2D videos to fusion processing and recognizes the 2D videos as a stereoscopic video.

A stereoscopic video technique known as a 3D video technique is a technique for dividing two kinds of 2D videos recorded by two camera lenses into a video for the left eye and a video for the right eye and providing the videos to the left eye and the right eye of the human to thereby represent a cubic effect. However, there is a problem in that a stereo camera mounted with two camera lenses is extremely expensive, there are extremely many matters that should be considered in order to embody a high-quality 3D video such as a system for arraying the stereo camera, the distance between the cameras, a system for adjusting an angle and a focus, a geometrical problem due to the camera array, and work for matching color senses, brightness, and the like, and the stereo camera is complicated. Therefore, in general, a method of converting a 2D video into a 3D video is used rather than creating a 3D video from the beginning.

A 3D video can be generated by moving only binocular parallax equivalent to predetermined depth information with respect to objects of an original 2D video. That is, to convert the 2D video into a 3D video, a process for generating a depth map in the 2D video is necessary. The depth map serves as a map indicating a three-dimensional distance to an object in the 2D video and can be represented as a gray scale value between 0 and 255 for each pixel. As a value of depth has a larger value (meaning a brighter color), the value of depth indicates a closer distance from a position where a video is viewed. In this way, the 3D video is generated using the 2D video and the depth information. Therefore, to create a high-quality 3D video from the 2D video, it is necessary to accurately generate the depth map. In the generation of the accurate depth map, a relation between objects and background in image frames forming the 2D video, the positions of the objects, overlap among the objects, volumes of the objects, and the like should be comprehensively considered. Therefore, generation work for the accurate depth map is work in which an expert engineer divides, generally in pixel units, along contours of the objects and contours of predetermined regions in the objects, a region desired to be made three-dimensional while visually checking overlap of the individual objects and overlap of the objects and the backgrounds.

Incidentally, besides the manual work explained above, a watershed algorithm is known as one of region dividing methods used for extracting a target region in an image. This algorithm is a method of regarding gray scale information (brightness, etc.) as height in terms of geographical features and dividing the image such that, when water is filled in the geographical features, a boundary is formed between the water accumulated in a pit and the water accumulated in another pit different from the pit. It is also possible to divide objects in frames (images) forming the 2D video into a large number of regions using such an algorithm (see, for example, International Publication No. WO 2006/080239 and Japanese Patent Application Laid-Open No. 2008-277932).

SUMMARY OF INVENTION

Technical Problem

However, the conventional techniques have problems explained below. First, the method of dividing, with the manual work of the special engineer, the objects in the image frames forming the 2D video and the regions in the objects requires a very long time and requires a longest time and a largest labor in the process for converting the 2D video into the 3D video. Therefore, there is a problem in that costs for the generation process for the depth map are large. In addition, since the quality of the depth map also changes according to a level of a technique of an operator, there is a problem in that the quality of the final 3D video tends to fluctuate.

On the other hand, the region dividing method using the watershed algorithm is advantageous in terms of costs compared with the manual work by the special engineer because the regions are automatically divided by software. However, there is a problem in that division excessive for the generation of the 3D video (excessive division) is executed when the watershed algorithm is used. As a method of suppressing the excessive division, for example, there is also known a method of applying region integration processing to the watershed algorithm and regarding regions as the same region if a color difference is within a certain threshold not to form a boundary in a watershed region. As disclosed in Japanese Patent Application Laid-Open No. 2008-277932, there is also known a method of performing, using an anisotropic diffusion filter, smoothing processing in different degrees in the tangential direction of an edge and the perpendicular direction of the edge between objects in image frames of 2D video, between the objects and a background image, or between regions in the same object, removing noise without collapsing the shape of the edge, and erasing a pattern unnecessary for region division to suppress excessive division. However, even if these excessive division suppressing methods are performed, it is difficult to generate a frame for a 3D video that gives a natural cubic effect.

It is an object of the present invention to solve the problems explained above, that is, realize image processing for enabling, easily and with a less quality difference, generation of a 3D video that gives a natural cubic effect.

Solution to Problem

In order to attain the object, the inventor succeeded in developing a completely new excessive division suppressing method using a part of a conventionally publicly-known watershed algorithm. Excessive division of a region in the case of the use of the watershed algorithm has been regarded as a problem. There have been methods for suppressing the excessive division. However, such conventional excessive division suppressing method is suitable as processing for a still image of a biological organ picked up by an endoscope or the like but is not suitable as processing for converting a 2D moving image into a 3D moving image. In the still image in the former processing, unevenness of details of the biological organ has to be highly precisely rendered to a certain degree while suppressing excessive division. On the other hand, in the case of frames forming the 3D image in the latter processing, it is sufficient to cause a user viewing a moving image to stereoscopically visually recognize mainly an object in an image frame. It is unnecessary to render even unevenness representation of details. That is, in the case of the moving image in the latter processing, it is necessary to increase a suppressing degree of excessive division. From such a viewpoint, the inventor devised a method in which, if objects in an image frame are divided into several blocks by manual work of an operator, contours of the blocks can be accurately cut off by a computer. Depth information is given to the blocks by the visual sense of the operator or automatically given to the blocks by the computer. Specific means is as explained below.

An image processing apparatus according to an embodiment of the present invention includes at least: image-frame reading means for reading one or two or more image frames among a plurality of image frames forming a moving image; region-boundary-line-information receiving means for receiving information concerning a region boundary line in the read image frames; region dividing means for expanding a division region starting from a predetermined point on the region boundary line and dividing the inside and the outside of the region boundary line with division lines, which connect approximate points of brightness; opening processing means for leaving a first division line present between a pair of the region boundary lines among the division lines and opening a second division line other than the first division line among the division lines; separating means for separating regions in the image frames in units of a region surrounded by the first division line; and first depth-value giving means for giving, to the region surrounded by the first division line, a depth value representing a distance degree of the region.

The image processing apparatus according to another embodiment of the present invention further includes start-point generating means for generating a plurality of the start points on the region boundary line.

In the image processing apparatus according to another embodiment of the present invention, the region-boundary-line-information receiving means is means for receiving information concerning the region boundary line indicated targeting an object other than a background. The image processing apparatus at least further includes: background-boundary-line-information receiving means for receiving information concerning a background boundary line indicated targeting the background in the image frame; second depth-value giving means for giving, to a region surrounded by the background boundary line, a depth value representing a distance degree of the region; and object/background combining means for combining the object to which the depth value is given by the first depth-value giving means and the background to which the depth value is given by the second depth-value giving means.

The image processing apparatus according to another embodiment of the present invention further includes: location-point-presence/absence discriminating means for discriminating that a plurality of objects and/or an intra-background region forming a background is present in the image frame and a location point indicating positions of the objects and/or a position of the intra-background region in the background is present; object-predetermined-part-position specifying means for specifying a position of a predetermined part of the plurality of objects and/or the intra-background region forming the background when the location point is present; and depth-value determining means for determining, on the basis of the position specified by the object-predetermined-part-position specifying means, a depth value representing a distance degree of the objects and/or the intra-background region. The first depth-value giving means and/or the second depth-value giving means gives the depth value to the objects and/or the intra-background region.

The image processing apparatus according to another embodiment of the present invention is an image processing apparatus that makes it possible to automatically generate, among the plurality of image frames forming the moving image, when a first image frame, in which the region boundary line is already generated, is present, the region boundary line in a second image frame that is present later than the first image frame in time series. The image processing apparatus further includes: first feature-point receiving means for receiving a coordinate value of a first feature point present in the region boundary line of the first image frame; second feature-point specifying means for specifying a coordinate value of a second feature point corresponding to the coordinate value of the first feature point in the second image frame; and region-boundary-line automatically generating means for automatically generating, on the basis of movement information from the first feature point to the second feature point, a new region boundary line corresponding to the region boundary line of the first image frame in the second image frame.

The image processing apparatus according to another embodiment of the present invention further includes second feature-point searching means for searching for, prior to processing of the second feature-point specifying means, the second feature point corresponding to the coordinate value of the first feature point on the basis of an approximation degree of at least one of a color and brightness of a pixel.

The image processing apparatus according to another embodiment of the present invention further includes: number-of-image-frames-designation receiving means for receiving designation of the number of image frames on which processing by the region-boundary-line automatically generating means is executed; and number-of-frames discriminating means for discriminating whether the number of image frames on which the processing for automatically generating a new region boundary line is executed has reached the designated number of image frames. The image processing apparatus causes the first feature-point receiving means, the second feature-point specifying means, and the region-boundary-line automatically generating means to execute the respective kinds of processing until the number-of-frames discriminating means discriminates that the number of image frames has reached the designated number of image frames.

The image processing apparatus according to another embodiment of the present invention is an image processing apparatus that makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series. The image processing apparatus further includes: pixel-depth-value allocating means for allocating, to one or more first pixels present in the region surrounded by the first division line in the first image frame, the depth value given to the region surrounded by the first division line; pixel-moving-position tracking means for tracking the first pixels to find to which pixels in the second image frame the first pixels move; and depth-value automatically generating means for automatically generating the depth value allocated by the pixel-depth-value allocating means to a region in the second image frame, that is, a region formed by second pixels after the movement of the first pixels.

An image processing method according to an embodiment of the present invention is an image processing method executed using the image processing apparatus in the broadest term explained above, the image processing method including at least: an image-frame reading step for reading one or two or more image frames among a plurality of image frames forming a moving image; a region-boundary-line-information receiving step for receiving information concerning a region boundary line in the read image frames; a region dividing step for expanding a division region starting from a predetermined point on the region boundary line and dividing the inside and the outside of the region boundary line with division lines, which connect approximate points of brightness; an opening processing step for leaving a first division line present between a pair of the region boundary lines among the division lines and opening a second division line other than the first division line among the division lines; a separating step for separating regions in the image frames in units of a region surrounded by the first division line; and a first depth-value giving step for giving, to the region surrounded by the first division line, a depth value representing a distance degree of the region.

The image processing method according to another embodiment of the present invention further includes a start-point generating step for generating a plurality of the start points on the region boundary line.

In the image processing method according to another embodiment of the present invention, the region-boundary-line-information receiving step is a step of receiving information concerning the region boundary line indicated targeting an object other than a background. The image processing method at least further includes: a background-boundary-line-information receiving step for receiving information concerning a background boundary line indicated targeting the background in the image frame; a second depth-value giving step for giving, to a region surrounded by the background boundary line, a depth value representing a distance degree of the region; and an object/background combining step for combining the object to which the depth value is given by the first depth-value giving step and the background to which the depth value is given by the second depth-value giving step.

The image processing method according to another embodiment of the present invention further includes: a location-point-presence/absence discriminating step for discriminating that a plurality of objects and/or an intra-background region forming a background is present in the image frame and a location point indicating positions of the objects and/or a position of the intra-background region in the background is present; an object-predetermined-part-position specifying step for specifying a position of a predetermined part of the plurality of objects and/or the intra-background region forming the background when the location point is present; and a depth-value determining step for determining, on the basis of the position specified by the object-predetermined-part-position specifying step, a depth value representing a distance degree of the objects and/or the intra-background region. The depth value is given to the objects and/or the intra-background region by the first depth-value giving step and/or the second depth-value giving step.

The image processing method according to another embodiment of the present invention is an image processing method that makes it possible to automatically generate, among the plurality of image frames forming the moving image, when a first image frame, in which the region boundary line is already generated, is present, the region boundary line in a second image frame that is present later than the first image frame in time series. The image processing method further includes: a first feature-point receiving step for receiving a coordinate value of a first feature point present in the region boundary line of the first image frame; a second feature-point specifying step for specifying a coordinate value of a second feature point corresponding to the coordinate value of the first feature point in the second image frame; and a region-boundary-line automatically generating step for generating, on the basis of movement information from the first feature point to the second feature point, a new region boundary line corresponding to the region boundary line of the first image frame in the second image frame.

The image processing method according to another embodiment of the present invention further includes a second feature-point searching step for searching for, prior to processing of the second feature-point specifying step, the second feature point corresponding to the coordinate value of the first feature point on the basis of an approximation degree of at least one of a color and brightness of a pixel.

The image processing method according to another embodiment of the present invention further includes: a number-of-image-frames-designation receiving step for receiving designation of the number of image frames on which processing by the region-boundary-line automatically generating step is executed; and a number-of-frames discriminating means for discriminating whether the number of image frames on which the processing for automatically generating a new region boundary line is executed has reached the designated number of image frames. The image processing method executes the first feature-point receiving step, the second feature-point specifying step, and the region-boundary-line automatically generating step until it is discriminated by the number-of-frames discriminating step that the number of image frames has reached the designated number of image frames.

The image processing method according to another embodiment of the present invention is an image processing method makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series. The image processing method further includes: a pixel-depth-value allocating step for allocating, to one or more first pixels present in the region surrounded by the first division line in the first image frame, the depth value given to the region surrounded by the first division line; a pixel-moving-position tracking step for tracking the first pixels to find to which pixels in the second image frame the first pixels move; and a depth-value automatically generating step for automatically generating a depth value allocated by the pixel-depth-value allocating step to a region in the second image frame, that is, a region formed by second pixels after the movement of the first pixels.

A computer program for image processing according to an embodiment of the present invention is a computer program read and executed by a computer, the computer program further causes the computer to execute functions of means including: image-frame reading means for reading one or two or more image frames among a plurality of image frames forming a moving image; region-boundary-line-information receiving means for receiving information concerning a region boundary line in the read image frames; region dividing means for expanding a division region starting from a predetermined point on the region boundary line and dividing the inside and the outside of the region boundary line with division lines, which connect approximate points of brightness; opening processing means for leaving a first division line present between a pair of the region boundary lines among the division lines and opening a second division line other than the first division line among the division lines; separating means for separating regions in the image frames in units of a region surrounded by the first division line; and first depth-value giving means for giving, to the region surrounded by the first division line, a depth value representing a distance degree of the region.

The computer program for image processing according to another embodiment of the present invention further causes the computer to execute a function of start-point generating means for generating a plurality of the start points on the region boundary line.

In the computer program for image processing according to another embodiment of the present invention, the region-boundary-line-information receiving means is means for receiving information concerning the region boundary line indicated targeting an object other than a background. The computer program for image processing further causes the computer to execute functions of: background-boundary-line-information receiving means for receiving information concerning a background boundary line indicated targeting the background in the image frame; second depth-value giving means for giving, to a region surrounded by the background boundary line, a depth value representing a distance degree of the region; and object/background combining means for combining the object to which the depth value is given by the first depth-value giving means and the background to which the depth value is given by the second depth-value giving means.

The computer program for image processing according to another embodiment of the present invention causes the computer to further execute functions of: location-point-presence/absence discriminating means for discriminating that a plurality of objects and/or an intra-background region forming a background is present in the image frame and a location point indicating positions of the objects and/or a position of the intra-background region in the background is present; object-predetermined-part-position specifying means for specifying a position of a predetermined part of the plurality of objects and/or the intra-background region forming the background when the location point is present; and depth-value determining means for determining, on the basis of the position specified by the object-predetermined-part-position specifying means, a depth value representing a distance degree of the objects and/or the intra-background region. The depth value is given to the objects and/or the intra-background region by the functions of the first depth-value giving means and/or the second depth-value giving means.

The computer program for image processing according to another embodiment of the present invention is a computer program for image processing that makes it possible to automatically generate, among the plurality of image frames forming the moving image, when a first image frame, in which the region boundary line is already generated, is present, the region boundary line in a second image frame that is present later than the first image frame in time series. The computer program for image processing further causes the computer to execute functions of: first feature-point receiving means for receiving a coordinate value of a first feature point present in the region boundary line of the first image frame; second feature-point specifying means for specifying a coordinate value of a second feature point corresponding to the coordinate value of the first feature point in the second image frame; and region-boundary-line automatically generating means for automatically generating, on the basis of movement information from the first feature point to the second feature point, a new region boundary line corresponding to the region boundary line of the first image frame in the second image frame.

The computer program for image processing according to another embodiment of the present invention further causes the computer to execute a function of second feature-point searching means for searching for, prior to processing of the second feature-point specifying means, the second feature point corresponding to the coordinate value of the first feature point on the basis of an approximation degree of at least one of a color and brightness of a pixel.

The computer program for image processing according to another embodiment of the present invention further causes the computer to execute functions of: number-of-image-frames-designation receiving means for receiving designation of the number of image frames on which processing by the region-boundary-line automatically generating means is executed; and number-of-frames discriminating means for discriminating whether the number of image frames on which the processing for automatically generating a new region boundary line is executed has reached the designated number of image frames. The computer program for image processing causes the first feature-point receiving means, the second feature-point specifying means, and the region-boundary-line automatically generating means to execute the respective kinds of processing until the number-of-frames discriminating means discriminates that the number of image frames has reached the designated number of image frames.

The computer program for image processing according to another embodiment of the present invention is a computer program for image processing that makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series. The computer program for image processing further causes the computer to execute functions of: pixel-depth-value allocating means for allocating, to one or more first pixels present in the region surrounded by the first division line in the first image frame, the depth value given to the region surrounded by the first division line; pixel-moving-position tracking means for tracking the first pixels to find to which pixels in the second image frame the first pixels move; and depth-value automatically generating means for automatically generating the depth value allocated by the pixel-depth-value allocating means to a region in the second image frame, that is, a region formed by second pixels after the movement of the first pixels.

An information recording medium having stored therein a computer program for image processing is an information recording medium having stored therein a computer program read and executed by a computer, the information recording medium having stored therein the computer program for image processing for further causing the computer to execute functions of means including: image-frame reading means for reading one or two or more image frames among a plurality of image frames forming a moving image; region-boundary-line-information receiving means for receiving information concerning a region boundary line in the read image frames; region dividing means for expanding a division region starting from a predetermined point on the region boundary line and dividing the inside and the outside of the region boundary line with division lines, which connect approximate points of brightness; opening processing means for leaving a first division line present between a pair of the region boundary lines among the division lines and opening a second division line other than the first division line among the division lines; separating means for separating regions in the image frames in units of a region surrounded by the first division line; and first depth-value giving means for giving, to the region surrounded by the first division line, a depth value representing a distance degree of the region.

The information recording medium having stored therein the computer program for image processing according to another embodiment of the present invention is an information recording medium having stored therein a computer program for image processing for further causing the computer to execute a function of start-point generating means for generating a plurality of the start points on the region boundary line.

The information recording medium having stored therein the computer program for image processing according to another embodiment of the present invention is an information recording medium having stored therein a computer program for image processing in which the region-boundary-line-information receiving means is means for receiving information concerning the region boundary line indicated targeting an object other than a background. The computer program for image processing further causes the computer to execute functions of: background-boundary-line-information receiving means for receiving information concerning a background boundary line indicated targeting the background in the image frame; second depth-value giving means for giving, to a region surrounded by the background boundary line, a depth value representing a distance degree of the region; and object/background combining means for combining the object to which the depth value is given by the first depth-value giving means and the background to which the depth value is given by the second depth-value giving means.

The information recording medium having stored therein the computer program for image processing according to another embodiment of the present invention is an information recording medium having stored therein a computer program for image processing for causing the computer to further execute functions of: location-point-presence/absence discriminating means for discriminating that a plurality of objects and/or an intra-background region forming a background is present in the image frame and a location point indicating positions of the objects and/or a position of the intra-background region in the background is present; object-predetermined-part-position specifying means for specifying a position of a predetermined part of the plurality of objects and/or the intra-background region forming the background when the location point is present; and depth-value determining means for determining, on the basis of the position specified by the object-predetermined-part-position specifying means, a depth value representing a distance degree of the objects and/or the intra-background region. The depth value is given to the objects and/or the intra-background region by the functions of the first depth-value giving means and/or the second depth-value giving means.

The information recording medium having stored therein the computer program for image processing according to another embodiment of the present invention is an information recording medium having stored therein a computer program for image processing that makes it possible to automatically generate, among the plurality of image frames forming the moving image, when a first image frame, in which the region boundary line is already generated, is present, the region boundary line in a second image frame that is present later than the first image frame in time series. The computer program for image processing further causes the computer to execute functions of: first feature-point receiving means for receiving a coordinate value of a first feature point present in the region boundary line of the first image frame; second feature-point specifying means for specifying a coordinate value of a second feature point corresponding to the coordinate value of the first feature point in the second image frame; and region-boundary-line automatically generating means for automatically generating, on the basis of movement information from the first feature point to the second feature point, a new region boundary line corresponding to the region boundary line of the first image frame in the second image frame.

The information recording medium having stored therein the computer program for image processing according to another embodiment of the present invention is an information recording medium having stored therein a computer program for image processing for further causing the computer to execute a function of second feature-point searching means for searching for, prior to processing of the second feature-point specifying means, the second feature point corresponding to the coordinate value of the first feature point on the basis of an approximation degree of at least one of a color and brightness of a pixel.

The information recording medium having stored therein the computer program for image processing according to another embodiment of the present invention is an information recording medium having stored therein a computer program for image processing for further causing the computer to execute functions of: number-of-image-framesdesignation receiving means for receiving designation of the number of image frames on which processing by the region-boundary-line automatically generating means is executed; and number-of-frames discriminating means for discriminating whether the number of image frames on which the processing for automatically generating a new region boundary line is executed has reached the designated number of image frames. The computer program for image processing causes the first feature-point receiving means, the second feature-point specifying means, and the region-boundary-line automatically generating means to execute the respective kinds of processing until the number-of-frames discriminating means discriminates that the number of image frames has reached the designated number of image frames.

The information recording medium having stored therein the computer program for image processing according to another embodiment of the present invention is an information recording medium having stored therein a computer program for image processing that makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series. The computer program for image processing further causes the computer to execute functions of: pixel-depth-value allocating means for allocating, to one or more first pixels present in the region surrounded by the first division line in the first image frame, the depth value given to the region surrounded by the first division line; pixel-moving-position tracking means for tracking the first pixels to find to which pixels in the second image frame the first pixels move; and depth-value automatically generating means for automatically generating the depth value allocated by the pixel-depth-value allocating means to a region in the second image frame, that is, a region formed by second pixels after the movement of the first pixels.

Advantageous Effects of Invention

According to the present invention, it is possible to realize image processing for enabling, easily and with a less quality difference, generation of a 3D video that gives a natural cubic effect.

DESCRIPTION OF EMBODIMENTS

Embodiments of the present invention are explained below with reference to the drawings.

A First Embodiment

1. An Image Processing Apparatus and an Image Processing Method

Figure 1:
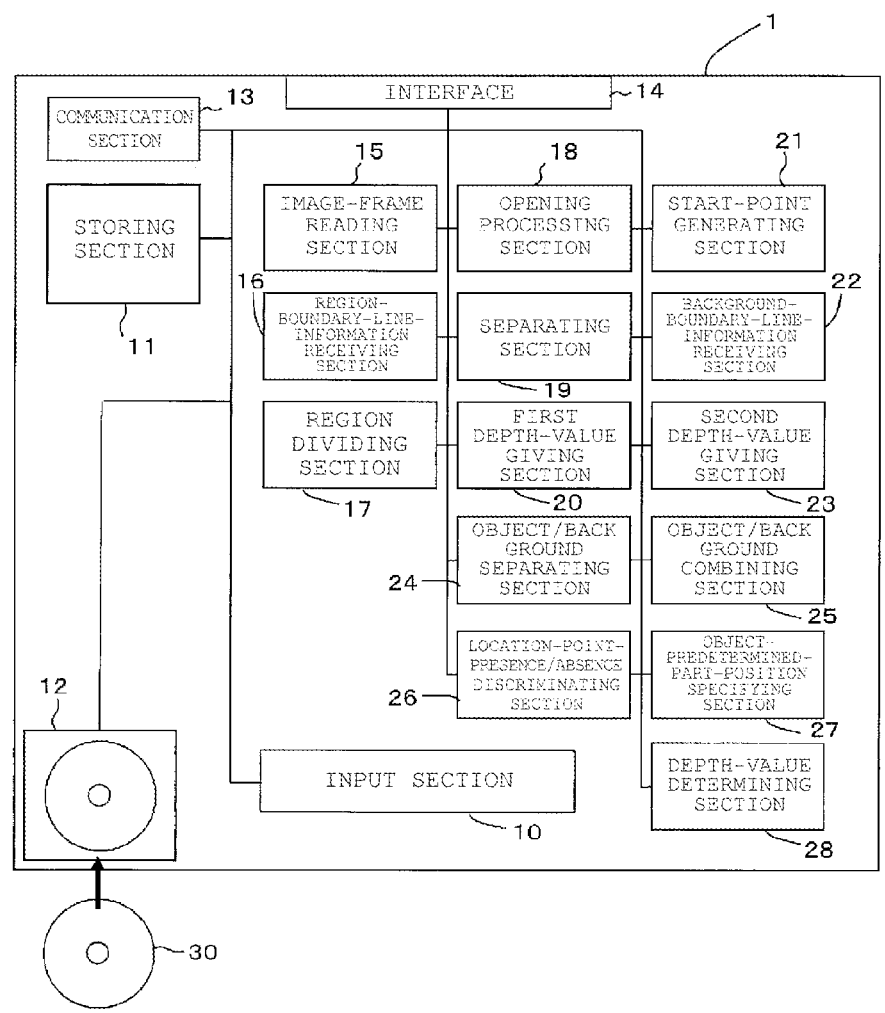
FIG. 1 shows a schematic diagram of an image processing apparatus according to an embodiment of the present invention.

FIG. 1 shows a schematic diagram of an image processing apparatus according to an embodiment of the present invention.

An image processing apparatus 1 according to this embodiment includes an input section 10, a storing section 11, an external-memory loading section 12, a communication section 13, an interface 14, an image-frame reading section 15, a region-boundary-line-information receiving section 16, a region dividing section 17, an opening processing section 18, a separating section 19, a first depth-value giving section 20, a start-point generating section 21, a background-boundary-line-information receiving section 22, a second depth-value giving section 23, an object/background separating section 24, an object/background combining section 25, a location-point-presence/absence discriminating section 26, an object-predetermined-part-position specifying section 27, and a depth-value determining section 28. These constituent sections are segmented according to functions of the constituent sections and shown. The constituent sections do not always mean physically segmented hardware. The input section 10 is a portion in which an operator who operates the image processing apparatus 1 performs various inputs. The input section 10 is configured by a keyboard, a pointing device, a touch-type operation board in which a touch sensor is used, and the like. The storing section 11 is a region where various kinds of information such as a computer program for image processing according to all embodiments including this embodiment are stored. The storing section 11 is configured by various storage means such as a ROM exclusive for reading, a readable and writable RAM, an EEPROM or a hard disk. For example, a moving image is stored in the storing section 11. The external-memory loading section 12 is a part for inserting or connecting a portable information recording medium 30 such as a CD-ft a USB memory (a flash memory), an MD, or a flexible disk into or to the image processing apparatus 1 and functioning as an entrance of information stored in the information recording medium 30. The information recording medium 30 can store a computer program for image processing according to the embodiment of the present invention. The information recording medium 30 may store a moving image.

The communication section 13 is a part that performs communication by radio or wire with the outside of the image processing apparatus 1 and receives information from the outside or transmits information to the outside. When the communication section 13 is a part that performs radio communication, an antenna and the like are also included in the communication section 13. The interface 14 is a part functioning as a connection port to the outside of the image processing apparatus 1. The interface 14 includes a light receiving section such as a receiving section for an infrared ray besides a physical connection port to a communication line or the like represented by an optical fiber. For example, when a moving image is stored in an external server, the communication section 13 may install data of the moving image from the interface 14 through the Internet and store the data in the storing section 11. A part of all of the communication section 13, the image-frame reading section 15, the region-boundary-line-information receiving section 16, the region dividing section 17, the opening processing section 18, the separating section 19, the first depth-value giving section 20, the start-point generating section 21, the background-boundary-line-information receiving section 22, the second depth-value giving section 23, the object/background separating section 24 and the object/background combining section 25, the location-point-presence/absence discriminating section 26, the object-predetermined-part-position specifying section 27, and the depth-value determining section 28 are configured by a processing device such as a CPU or an MPU.

The image-frame reading section 15 is a part functioning as image-frame reading means for reading one or two or more image frames among a plurality of image frames forming a moving image. The image frame is also simply referred to as "image" or "frame" and means still images forming the moving image. In this embodiment, as an example, the moving image is a 2D video. However, in a broader sense, the moving image is interpreted as including a 3D video. Usually, a moving image is formed by continuously displaying frames at speed of one frame per 30 msec. The image-frame reading section 15 may read frames displayed in 10 seconds at a time or may read only one frame. One or more frames read by the image-frame reading section 15 are stored by the image-frame reading section 15. In this regard, the image-frame reading section 15 functions as both of a processing device such as a CPU and a storage device such as a RAM. However, the frames read by the image-frame reading section 15 may be stored in the storing section 11. In such a case, the image-frame reading section 15 includes only the function of the processing device such as the CPU. When the image-frame reading section 15 executes reading processing, the image-frame reading section 15 desirably executes the processing while reading the computer program for image processing stored in the storing section 11 or the information recording medium 30.

The region-boundary-line-information receiving section 16 is a part functioning as region-boundary-line-information receiving means for receiving information concerning a region boundary line in an image frame read by the image-frame reading section 15. The region boundary line is a line drawn on the outer side and the inner side of a contour of an object (e.g., a person or a thing) in a frame or a predetermined region in the object and/or a predetermined region represented in a background (e.g., cloud or the like if the background is the sky, or light coming into water if the background is the water) by an operator who produces an image used in a 3D video using the image processing apparatus 1. Such a line is a set of dots (points). Therefore, the information concerning the region boundary line is suitably coordinates of the dots forming the region boundary line. When the operator draws region boundary lines on the outer side and the inner side of contours of one or a plurality of objects in a frame, predetermined regions in the objects, and predetermined regions in the background, the region-boundary-line-information receiving section 16 receives coordinates of dots forming the lines. The reception of the region-boundary-line-information receiving section 16 may be executed by special operation by the operator or may be automatically executed in every fixed time during line creation. When the region-boundary-line-information receiving section 16 functions as both of a processing device such as a CPU and a storage device such as a RAM, the region-boundary-line-information receiving section 16 stores received information on the inside. On the other hand, when the region-boundary-line-information receiving section 16 has only the function of the processing device such as the CPU, the received information may be stored in the storing section 11. When the region-boundary-line-information receiving section 16 executes reception processing, the region-boundary-line-information receiving section 16 desirably executes the processing while reading the computer program for image processing stored in the storing section 11 or the information recording medium 30.

The region dividing section 17 is a part functioning as region dividing means for expanding a division region starting from a predetermined point on the region boundary line and dividing the inside and the outside of the region boundary line with division lines, which connect approximate points of brightness. The start point may be all points forming the region boundary line or may be points set at every predetermined interval on the region boundary line. The region dividing section 17 suitably produces the division lines while expanding a region from the start point on the basis of a watershed algorithm. The region dividing section 17 sets regions on both sides separated by the region boundary line as division targets. Therefore, for example, when region boundary lines are present on the inside and the outside of a contour of an object, the division lines are produced in a region sandwiched by two region boundary lines, a region on the opposite side of the region boundary line on the inner side in two regions divided by the region boundary line on the outer side, and a region on the opposite side of the region boundary line on the outer side in two regions divided by the region boundary line on the inner side. The region dividing section 17 is configured by a processing device such as a CPU. When the region dividing section 17 executes the region division on the basis of the watershed algorithm, the region dividing section 17 desirably executes the processing while reading the computer program for image processing having the watershed algorithm stored in the storing section 11 or the information recording medium 30.

The opening processing section 18 is a part functioning as opening processing means for leaving a first division line present between a pair of the region boundary lines among the division lines and opening a second division line other than the first division line among the division lines. The division lines before the opening processing are lines of a closed state. The opening processing section 18 leaves the first division line present between the two region boundary lines and opens the other division line (the second division line). As a result, only the first division line passing substantially right above the contour of the object present between the two region boundary lines drawn by the operator is maintained in the closed state. The remaining division line changes to an open state. The opening processing section 18 is configured by a processing device such as a CPU. When the opening processing section 18 executes the opening processing, the opening processing section 18 desirably executes processing while reading the computer program for image processing stored in the storing section 11 or the information recording medium 30.

The separating section 19 is a part functioning as separating means for separating the object in units of a region surrounded by the first division line. That is, in order to produce a 3D video, the separating section 19 executes processing for dividing objects in frames into several regions. Consequently, one object has a plurality of regions having different kinds of depth information. The separating section 19 is configured by a processing device such as a CPU. When the separating section 19 executes the separation processing, the separating section 19 desirably executes the processing while reading the computer program for image processing stored in the storing section 11 or the information recording medium 30. The separating section 19 desirably has a function of separating regions divided by a background boundary line (details are explained below) traced along a boundary of a background set as a target. When the separating section 19 executes the separating processing, the separating section 19 desirably executes the processing while reading the computer program for image processing stored in the storing section 11 or the information recording medium 30.

The first depth-value giving section 20 is a part functioning as first depth-value giving means for giving, to the region surrounded by the first division line, a depth value representing a distance degree of the region. When the depth value is given with reference to brightness, a larger numerical value of the depth value means that the region is present closer to a viewer. The operator may determine the depth value from characteristics of an object and manually give the depth value. Alternatively, as explained below, when a reference of a distance is present on a background side, the depth value may be automatically given. That is, the first depth-value giving section 20 has a function of, when a depth value representing a distance degree of an object is determined on the basis of the position of a predetermined part of the object, giving the depth value to the object. The first depth-value giving section 20 is configured by a processing device such as a CPU. When the first depth-value giving section 20 executes the giving processing, the first depth-value giving section 20 desirably executes the processing while reading the computer program for image processing stored in the storing section 11 or the information recording medium 30.

The start-point generating section 21 is a part functioning as start-point generating means for generating a plurality of the start points on the region boundary line. As explained above, the start point is a starting point for starting the region division. The start point may be any point on the region boundary line or a point away from the any point by a predetermined distance. The any point is desirably optionally selected by the start-point generating section 21. However, a generation method for the start point is not limited to the method and may be another method. For example, a point at a bending corner on the region boundary line may be set as the start point. When the start-point generating section 21 executes the start-point generation processing, the start-point generating section 21 desirably executes the processing while reading the computer program for image processing stored in the storing section 11 or the image recording medium 30. The start-point generating section 21 is not an essential part and does not have to be provided. When the start-point generating section 21 is not provided, for example, the processing of the region division is performed starting from all the points forming the region boundary line.

The background-boundary-line-information receiving section 22 is a part functioning as background-boundary-line-information receiving means for receiving information concerning a background boundary line indicated by the operator targeting the background in the image frame. The background boundary line is a line drawn by the operator tracing on contours of several regions forming the background in order to divide the background into several regions. Such a line is a set of dots (points). Therefore, the information concerning the background boundary line is, for example, coordinates of the dots forming the background boundary line. When the operator draws the background boundary line along contours of predetermined regions in the background present in the frame, the background-boundary-line-information receiving section 22 receives coordinates of dots forming the line. The reception of the background-boundary-line-information receiving section 22 may be executed by special operation by the operator or may be automatically executed in every fixed time during line creation. When the background-boundary-line-information receiving section 22 functions as both of a processing device such as a CPU and a storage device such as a RAM, the background-boundary-line-information receiving section 22 stores the received information on the inside. On the other hand, when the background-boundary-line-information receiving section 22 has only the function of the processing device such as the CPU, the received information may be stored in the storing section 11. When the background-boundary-line-information receiving section 22 executes the reception processing, the background-boundary-line-information receiving section 22 desirably executes the processing while reading the computer program for image processing stored in the storing section 11 or the information recording medium 30. The background-boundary-line-information receiving section 22 is not an essential part and does not have to be provided. For example, when it is unnecessary to divide the background into a plurality of regions, the background-boundary-line-information receiving section 22 is not always necessary.

The second depth-value giving section 23 is a part functioning as second depth-value giving means for giving, to a region surrounded by the background boundary line, a depth value representing a distance degree of the region. When the depth value is given with reference to brightness, a larger numerical value of the depth value means that the region is present closer to a viewer. The operator may determine the depth value from characteristics of a predetermined region in the background and manually give the depth value. Alternatively, as explained below, when a reference of a distance is present on a background side, the depth value may be automatically given. That is, the second depth-value giving section 23 has a function of, when a depth value representing a distance degree of an intra-background region forming the background is determined on the basis of the position of a predetermined part of the intra-background region, giving the depth value to the intra-background region. The second depth-value giving section 23 is configured by a processing device such as a CPU. When the second depth-value giving section 23 executes the giving processing, the second depth-value giving section 23 desirably executes the processing while reading the computer program for image processing stored in the storing section 11 or the information recording medium 30. The second depth-value giving section 23 is not an essential part and does not have to be provided. For example, when it is unnecessary to divide the background into a plurality of regions, the second depth-value giving section 23 is not always necessary.

The object/background separating section 24 is a part functioning as object/background separating means for separating an object other than a background in an image frame and the background. The object/background separating section 24 is effective when objects and a plurality of regions in the objects are separated by a method of separating the objects and the plurality of regions (a method A) and a background and a plurality of regions in the background are separated by a method (a method B) different from the method A. The object/background separating section 24 suitably performs processing for separating the objects and the regions on the inside of the objects using the method A and thereafter separates an image after the processing and the background. However, it is also possible that the operator indicates boundaries between the objects and the background prior to the processing of the method A and, thereafter, the object/background separating section 24 separates the background from the image frame on the basis of the indication. When the object/background separating section 24 executes the separation processing, the object/background separating section 24 desirably executes the processing while reading the computer program for image processing stored in the storing section 11 or the information recording medium 30.

The object/background combining section 25 is a part functioning as object/background combining means for combining the object to which the depth value is given by the first depth-value giving section 20 and the background (including the regions in the background) to which the depth value is given by the second depth-value giving section 23. The object/background combining section 25 is effective when objects and a plurality of regions in the objects are separated by a method of separating the objects and the plurality of regions (the method A) and a background and a plurality of regions in the background are separated by a method (the method B) different from the method A. For example, the object/background combining section 25 performs processing for separating the objects and the regions on the inside of the objects using the method A, performs, in parallel to the processing, processing for separating the background and the regions on the inside of the background using the method B, and thereafter combines the objects after the separation processing and the background after the separation processing. When the object/background combining section 25 executes the combination processing, the object/background combining section 25 desirably executes the processing while reading the computer program for image processing stored in the storing section 11 or the information recording medium 30.

Note that, when no image processing for 3D is necessary for the background and the image processing for 3D is necessary only for the objects other than the background, the object/background combining section 25 is not always necessary. The function of the object/background separating section 24 may be integrated with the object/background combining section 25. Further, it is also possible that the object/background separating section 24 is not provided, two same image frames are prepared by copying or the like, separation processing (separation processing by the method A) is performed on an object in one image frame and a region on the inside of the object, another kind of separation processing (separation processing by the method B) is performed on a background in the other image frame and a region on the inside of the background, and the object and the background subjected to the respective kinds of separation processing are combined. In that regard, the object/background separating section 24 is a constituent section suitably included as an option.

The location-point-presence/absence discriminating section 26 is a part functioning as location-point-presence/absence discriminating means for discriminating that a plurality of objects and/or an intra-background region forming a background is present in the image frame and a location point indicating positions of the objects and/or a position of the intra-background region in the background is present. The intra-background region is a region forming the background and different from the objects. The location point refers to a point, a line, or a surface serving as a reference of a distance degree of two or more objects and the intra-background region. Various location points could be present. For example, a boundary line between a wall and a floor in the background can be suitably illustrated. Presence or absence of the location point may be automatically discriminated from light and shade in an image. However, it is also possible that the operator designates the location point, whereby the location-point-presence/absence discriminating section 26 determines that the location point is present. When the location-point-presence/absence discriminating section 26 executes the discrimination processing, the location-point-presence/absence discriminating section 26 desirably executes the processing while reading the computer program for image processing stored in the storing section 11 or the information recording medium 30.

The object-predetermined-part-position specifying section 27 is a part functioning as object-predetermined-part-position specifying means for specifying a position of a predetermined part of the plurality of objects and/or the intra-background region when the location point is present. The predetermined part is not particularly limited. For example, the predetermined part refers to an upper part, a lower part, or a side part of the object or the intra-background region. The predetermined part can change according to a type of an image, a type of an object and an intra-background region in the image, or the like. Therefore, the operator of the image processing apparatus 1 manually determines the predetermined part. For example, when a plurality of objects (e.g., humans) are present in the image in which the location point is present, the operator designates toes of the objects as predetermined parts. The object-predetermined-part-position specifying section 27 calculates distances from the location point to the toes of the objects and specifies the positions of the toes. When the objectpredetermined-part-position specifying section 27 executes the position specifying processing, the object-predetermined-part-position specifying section 27 desirably executes the processing while reading the computer program for image processing stored in the storing section 11 or the information recording medium 30.

The depth-value determining section 28 is a part functioning as depth-value determining means for determining, on the basis of the position specified by the object-predetermined-part-position specifying section 27, a depth value representing a distance degree of the objects and/or the intra-background region. In the example explained above, when the positions of the toes of the humans are determined, distance degrees from the location point can be calculated. When the depth value is set in a range of 0 to 255, the depth-value determining section 28 gives numerical values in the range of 0 to 255 as depth values on the basis of an anteroposterior relation among the humans and the positions from the location point. It is desirable to set a relation between the positions of the predetermined parts and the depth values in advance according to allocation or the like using a calculation formula or a table. When the depth-value determining section 28 executes the determination processing the depth value, the depth-value determining section 28 desirably executes the processing while reading the computer program for image processing stored in the storing section 11 or the information recording medium 30.

Figure 2:
FIG. 2 shows an example of one image frame forming a moving image.
Figure 3:
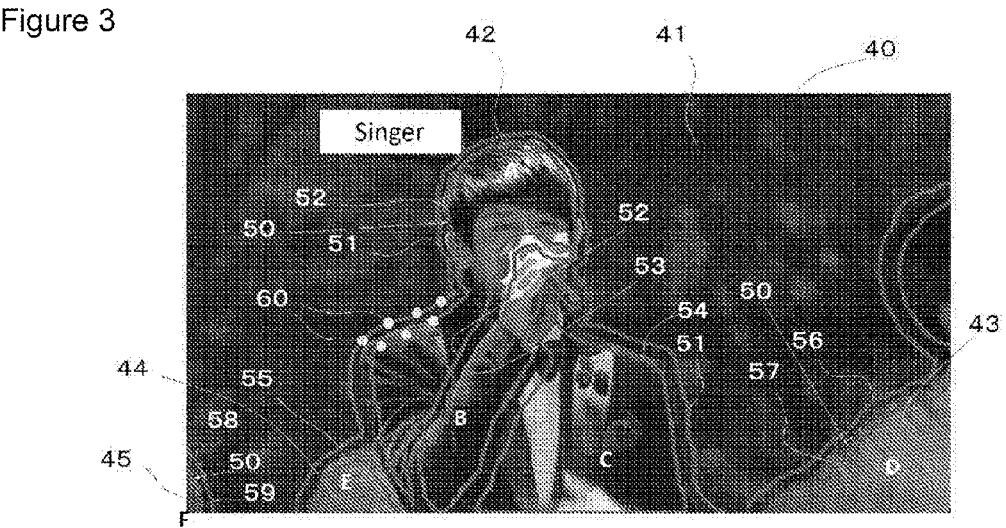
FIG. 3 shows a state in which an operator of the image processing apparatus shown in FIG. 1 draws region boundary lines on the image frame shown in FIG. 2.
Figure 4:
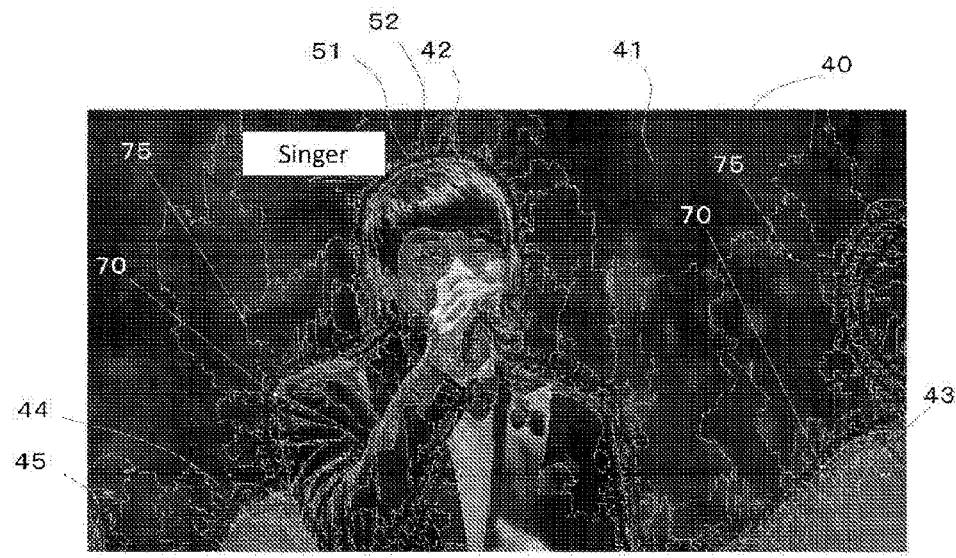
FIG. 4 shows a state in which region division is performed in the image frame shown in FIG. 3.
Figure 5:
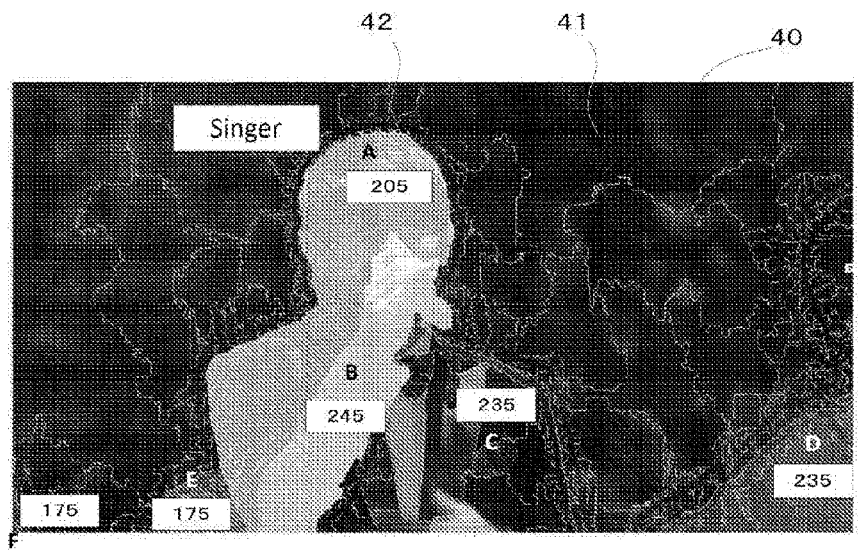
FIG. 5 shows a state in which separation processing and first depth value giving processing are performed in the image frame shown in FIG. 4.
Figure 6:
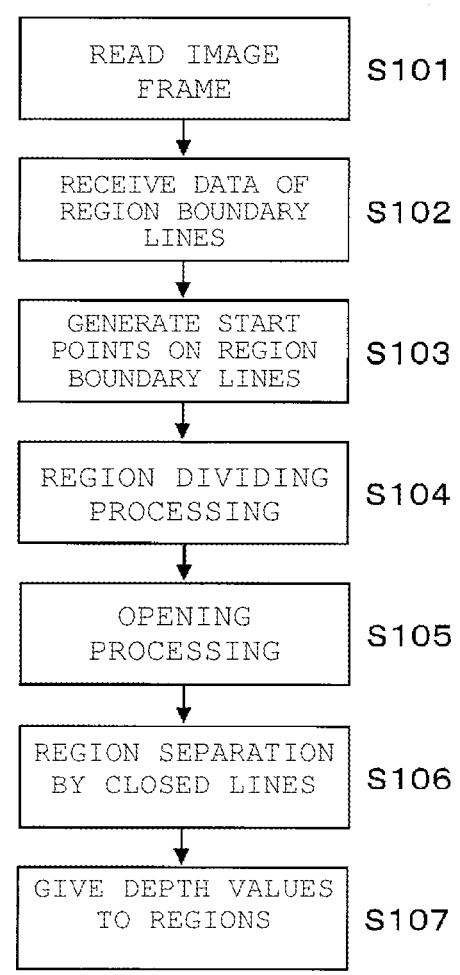
FIG. 6 shows a flowchart for performing image processing for a 3D video on an image frame forming a moving image with the image processing apparatus shown in FIG. 1.

FIG. 2 shows an example of one image frame forming a moving image. FIG. 3 shows a state in which the operator of the image processing apparatus shown in FIG. 1 draws region boundary lines on the image frame shown in FIG. 2. FIG. 4 shows a state in which region division is performed in the image frame shown in FIG. 3. FIG. 5 shows a state in which the separation processing and the first depth-value giving processing are performed in the image frame shown in FIG. 4. FIG. 6 shows a flowchart for performing image processing for a 3D video on the image frame forming the moving image with the image processing apparatus shown in FIG. 1.

The processing by the image processing apparatus shown in FIG. 1 is explained with reference to the image frames shown in FIG. 2 to FIG. 5 as examples on the basis of the flowchart of FIG. 6.

(Step 101: An Image-Frame Reading Step)

The image processing apparatus 1 reads, with the function of the image-frame reading section 15, one or two or more image frames forming a moving image from the storing section 11. The image frame is, for example, an image 40 shown in FIG. 2. In the FIG. 40, a background 41, a singer 42, and other people 43, 44, and 45 are mainly present. In the background 41, the singer 42 and the people 43, 44, and 45 (a distance relation among the people 43, 44, and 45 may be unknown) are present in order from a position closest to a viewer side of the image 40.

(Step 102: A Region-Boundary-Line-Information Receiving Step)

In this example, the operator of the image processing apparatus 1 performs processing for giving perspective to the singer 42 and the people 43, 44, and 45 with respect to the background 41 and further giving perspective to a plurality of parts in an object, i.e., the singer 42. From this purpose, the operator draws region boundary lines 51, 52, 53, 54, 55, 56, 57, 58, and 59 in order to divide the singer 42 into three regions of a head A, an arm B, and a chest C and set regions D, E, and F respectively for the people 43, 44, and 45 (see FIG. 3). When the operator draws the region boundary lines 51 to 59 on the image 40, the region-boundary-line-information receiving section 16 of the image processing apparatus 1 receives coordinate data of dots forming the region boundary lines 51 to 59. The region boundary line 51 is a line tracing the outer side of a contour 50 of the singer 42 and the person 44. At the same time, the region boundary line 51 is a line also tracing a part of the outer side of the contour of the chest C. The region boundary line 52 is a line tracing the inner side of the contour of the head A from the head to the shoulder of the singer 42. At the same time, the region boundary line 52 is a line also tracing a part of the outer side of the contour of the arm B and a part of the outer side of the contour of the person 44. The region boundary line 53 is a line tracing the inner side of the contour of the arm B. The region boundary line 54 is a line tracing the inner side of the contour of the chest C. The region boundary line 55 is a line tracing the inner side of the contour of the person 44. The region boundary line 56 is a line tracing the outer side of the contour 50 of the person 43. The region boundary line 57 is a line tracing the inner side of the contour 50 of the person 43. The region boundary line 58 is a line tracing the outer side of the contour 50 of the person 45. The region boundary line 59 is a line tracing the inner side of the contour 50 of the person 45.

(Step 103: A Start-Point Generating Step)

The start-point generating section 21 of the image processing apparatus 1 generates, at a predetermined interval, start points 60 for starting processing of region division on the region boundary lines 51 to 59. The predetermined interval is interpreted in a broader sense to include not only meaning of separating the start points by a fixed distance but also meaning of separating the start points by different distances. In FIG. 3, for easiness of understanding, the start points 60 are displayed only in parts of the region boundary lines 51 and 52. However, the start points 60 are generated over the entire lengths of all of the region boundary lines 51 to 59. As the generation of the start points 60, it is also possible that any points on the region boundary line 51 and the like are selected by the start-point generating section 21 and the other start points 60 are generated one after another with reference to the any points. It is also possible that the operator selects any points on the region boundary line 51 and the like and the start-point generating section 21 generates the other start points 60 one after another with reference to the any points. In this way, the generation method for the start points 60 is not limited to one type. Various methods can be adopted.

(Step 104: A Region Dividing Step)

The region dividing section 17 of the image processing apparatus 1 divides the inside and the outside of the region boundary lines with division lines, which connect approximate points of brightness, to expand division regions toward the inner side and the outer side of the region boundary line 51 and the like from the start points 60. FIG. 4 shows a state in which many division lines (white thin lines) 70 and 75 of a closed state are formed on the image 40. In FIG. 4, the region boundary line 51 and the like are indicated by black substantially the same as a background color not to be confused with the division lines 70 and 75. The division lines 70 and 75 can be suitably formed by the watershed algorithm. When compared to geographical features, the division lines 70 and 75 are equivalent to contour lines and are lines that connect pixels having the same brightness. As it is evident from FIG. 4, the division lines 70 and 75 are extremely highly accurately formed. Therefore, unevenness on a screen is finely represented. However, from the viewpoint of producing a 3D video, such division is excessive division. Therefore, in the next and subsequent processing, processing based on the region boundary lines 51 to 59 drawn by the operator is performed to correct the excessive division.

(Step 105: An Opening Processing Step)

The opening processing section 18 of the image processing apparatus 1 performs processing for opening the division lines of the closed state (also referred to as second division lines 75) present in other regions excluding regions sandwiched by the two region boundary lines 51 and 52 or the like. As a result, only the vision lines 70 (also referred to as first division lines) present in the regions sandwiched by the two region boundary lines 51 and 52 or the like, that is, regions where the contours 50 of the head A, the arm B, and the chest C of the singer 42 and the contours 50 of the people 43, 44, and 45 are present remain in a closed state. This opening processing is processing for using, for a 3D video, only regions surrounded by the division lines 70 of the closed state and excluding the other regions (the regions surrounded by the division lines 75) from processing targets for the 3D video.

(Step 106: A Separating Step by Closed Lines)

The separating section 19 of the image processing apparatus 1 separates an object for each of the regions surrounded by the first division lines 70. As a result, the singer 42 is separated into three regions of the head A (also referred to as region A), the arm B (also referred to as region B), and the chest C (also referred to as region C). The people 43, 44, and 45 respectively change to the region D, the region E, and the region F and are separated from the background 41. FIG. 5 shows only the regions A and B in white among the separated regions A to F.

(Step 107: A First Depth-Value Giving Step)

The first depth-value giving section 20 of the image processing apparatus 1 gives, to the regions A to F surrounded by the first division lines 70, depth values representing distance degrees of the regions. The depth values are not particularly limited as long as the depth values are values obtained by quantizing distance degrees with respect to the depth direction of the screen of the image 40. For example, the depth values can be represented by numerical values 0 to 255 with reference to gray scale information (suitably, brightness). It is desirable to give depth values to the respective regions A to F to be larger from the depth toward the front of the image 40. FIG. 5 shows a state in which the depth values are given to the regions A to F. Since the depth value of the region B is the largest, the arm B is present in the forefront in the image 40. On the other hand, because the depth values of the regions E and F are the smallest, the people 44 and 45 are present in the innermost part. In this embodiment, the operator manually inputs these depth values viewing the image 40. The first depth-value giving section 20 of the image processing apparatus 1, which receives the input, gives the depth values. However, the depth values may be automatically given as explained below without depending on the manual input by the operator. Details of the automatic giving of the depth values are explained below.

Figure 7:
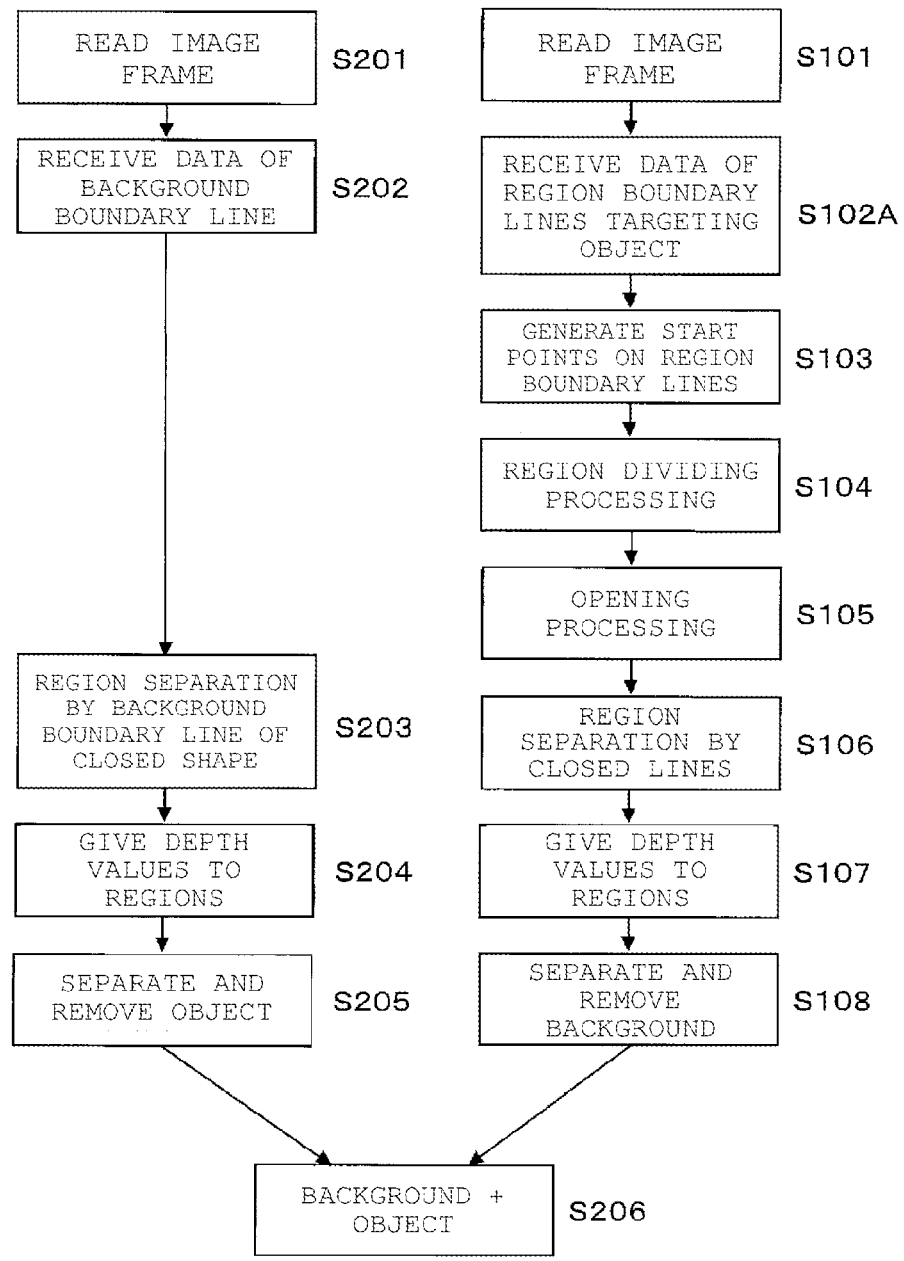
FIG. 7 shows a flow of an application example executed by the image processing apparatus shown in FIG. 1.

FIG. 7 shows a flow of an application example executed by the image processing apparatus shown in FIG. 1.

The flow shown in FIG. 7 shows an example in which image processing is performed separately on a background in an image frame and an object other than the background. Processing from step 101 (S101) to 107 (S107) in FIG. 7 is the same as the processing explained above. However, step 102A (S102A) in FIG. 7 is processing more limited than step 102 (S102) in that step 102A (S102A) is processing for receiving data of a region boundary line targeting the object (a person or the like) other than the background. When the processing in step 107 is completed, the object/background separating section 24 in the image processing apparatus 1 separates the object subjected to the processing up to step 107 and the background around the object and removes the background (step 108).

(Step 201: An Image-Frame Reading Step)

In parallel to steps 101 to 108, the image processing apparatus 1 reads, with the function of the image-frame reading section 15, an image frame same as the image frame read in step 101 from the storing section 11.

(Step 202: A Background-Boundary-Line-Information Receiving Step)

Subsequently, the background-boundary-line-information receiving section 22 in the image processing apparatus 1 receives information concerning background boundary lines indicated as targeting a background by the operator in the read image frame. The background boundary lines are lines obtained by the operator tracing the periphery of the boundary and regions that can be viewed the same as the background (intra-background regions). For example, in an example in which cloud is present in a background and an airplane is present in the background, if the airplane is an object, the cloud is equivalent to an intra-background region that can be regarded the same as the background. When the operator draws a background boundary line around the cloud, the background-boundary-line-information receiving section 22 receives information concerning the background boundary line.

(Step 203: A Separating Step by Background Boundary Lines of a Closed State)

The separating 19 recognizes and separates a plurality of regions divided by background boundary lines of the closed state. The background changes to a plurality of regions having different depths according to the following processing.

(Step 204: A Second Depth-Value Giving Step)

The second depth-value giving section 23 gives, to the regions surrounded by the background boundary lines, depth values representing distance degrees of the regions. The depth values are not particularly limited as long as the depth values are values obtained by quantizing distance degrees with respect to the depth direction of the screen. For example, the depth values can be represented by numerical values 0 to 255 with reference to gray scale information (suitably, brightness). For example, the depth values are desirably given to increase from the depth toward the front of the screen. In this embodiment, the operator manually inputs the depth values viewing a state of the background. The second depth-value giving section 23 of the image processing apparatus 1, which receives the input, gives the depth values. However, the depth values may be automatically given as explained below without depending on the manual input by the operator.

(Step 205: An Object Separating and Removing Step)

When the processing in step 204 is completed, the object/background separating section 24 in the image processing apparatus 1 separates the background subjected to the processing up to step 204 and the object other than the background and removes the object.

(Step 206: An Object/Background Combining Step)

Finally, the object/background combining section 25 combines the object after step 108 and the background after step 205 and re-forms one image frame.

Figure 8:
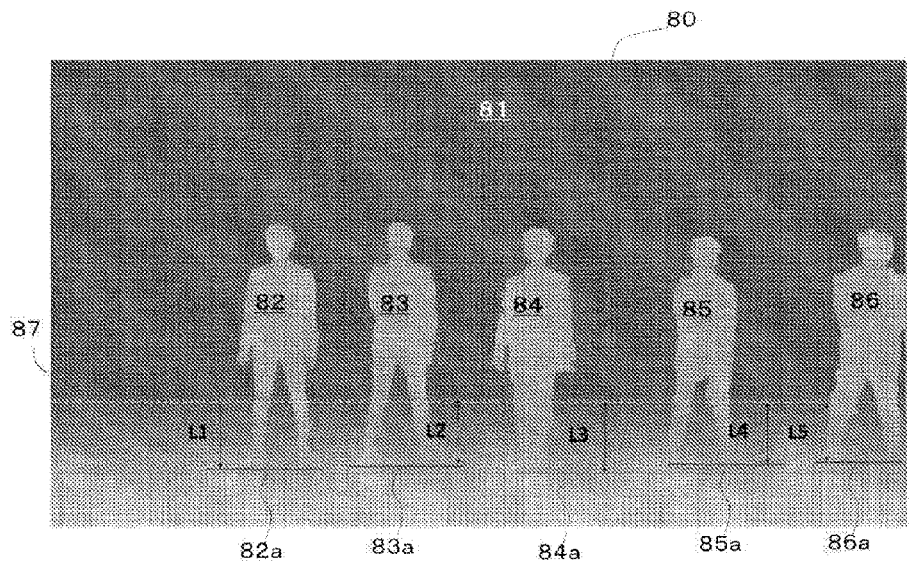
FIG. 8 shows a preferred image example for explaining automatic giving of a depth value executed by the image processing apparatus shown in FIG. 1.
Figure 9:
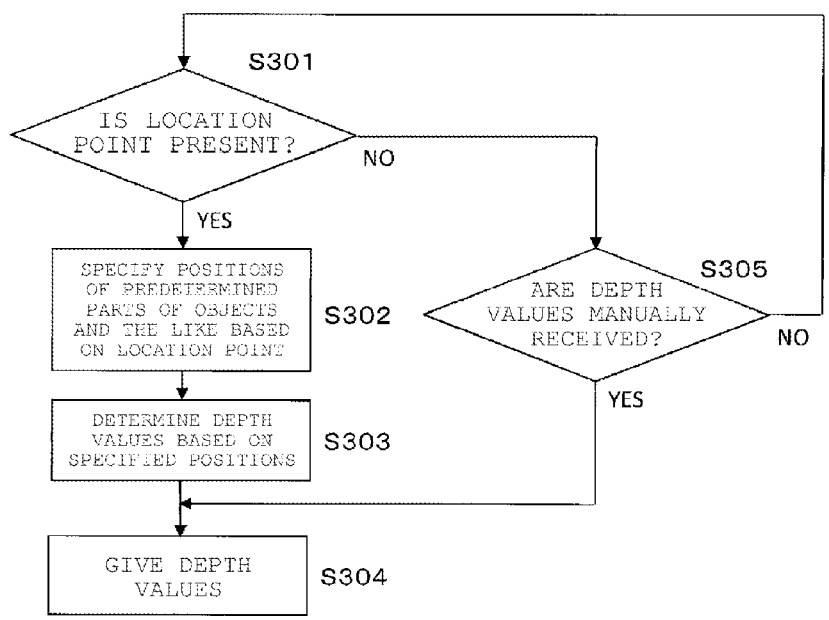
FIG. 9 shows a flowchart of preferred processing for automatically giving a depth value with the image processing apparatus shown in FIG. 1.

FIG. 8 shows an example of a preferred image frame for explaining the automatic giving of depth values executed by the image processing apparatus shown in FIG. 1. FIG. 9 shows a flowchart of preferred processing for automatically giving depth values with the image processing apparatus shown in FIG. 1.

The processing by the image processing apparatus shown in FIG. 1 is explained with reference to an image frame shown in FIG. 8 as an example on the basis of the flowchart of FIG. 9.

(Step 301: A Location-Point-Presence/Absence Discriminating Step)

The location-point-presence/absence discriminating section 26 discriminates presence or absence of a location point, for example, from a reference concerning whether a portion where brightness suddenly changes is present in a background. As a modification, it is also possible that, after the operator designates the location point, the location-point-presence/absence discriminating section 26 can discriminate presence or absence of the location point. An example is explained in which, in an image 80 shown in FIG. 8, a background 81 and objects (in this example, humans) 82 to 86 are present. The background 81 is configured from a floor and a wall. In this example, a step of brightness is present in a boundary between the floor and the wall. The location-point-presence/absence discriminating section 26 recognizes this step as a location point 87 and discriminates that the location point 87 is present. As a modification, it is also possible that the operator views the image 80 and designates the boundary between the floor and the wall as the location point 87 and, on the basis of this designation, the location-point-presence/absence discriminating section 26 discriminates that the location point 87 is present.

(Step 302: An Object-Predetermined-Part-Position Specifying Step)

If the location point 87 is present in step 301, subsequently, the object-predetermined-part-position specifying section 27 calculates distances L1 to L5 between toes (=predetermined parts) 82a to 86a of the objects 82 to 86 and the location point 87 and specifies the positions of the predetermined parts.

(Step 303: A Depth-Value Determining Step)

Subsequently, the depth-value determining section 28 determines depth values on the basis of the positions specified in step 302. In the example shown in FIG. 8, the depth-value determining section 28 determines the depth values assuming that, as the distances from the location point 87 to the toes 82a to 86a of the objects 82 to 86 are shorter, the toes 82a to 86a of the objects 82 to 86 are located further in the depth direction from the screen.

(Step 304: A Depth-Value Giving Step)

Subsequently, the first depth-value giving section 20 gives the depth values determined in step 303 to the objects 82 to 86. When it is necessary to give the depth values to a plurality of intra-background regions instead of the objects 82 to 86, the second depth-value giving section 23 gives the depth values to the intra-background regions.

(Step 305: A Manual Depth Value Reception Discriminating Step)

If the location point is absent as a result of the discrimination in step 301, the first depth-value giving section 20 and/or the second depth-value giving section 23 discriminates whether depth values are manually received by the operator. When the depth values are manually received by the operator as a result of the discrimination, the first depth-value giving section 20 and/or the second depth-value giving section 23 continuously proceeds to step 304 and gives the depth values to the objects and/or the intra-background regions. On the other hand, if the depth values are not manually received by the operator, the processing returns to step 301.

2. A Computer Program for Image Processing and an Information Recording Medium Having Stored Therein the Computer Program for Image Processing An embodiment of a computer program for image processing is a program read and executed by the image processing apparatus 1 (referred to as computer), the program causing the computer to execute the functions of the image-frame reading section 15 that reads one or two or more image frames among a plurality of image frames forming a moving image, the region-boundary-line-information receiving section 16 that receives information concerning a region boundary line in the read image frames, the region dividing section 17 that expands a division region starting from a predetermined point on the region boundary line and divides the inside and the outside of the region boundary line with division lines, which connect approximate points of brightness, the opening processing section 18 that leaves a first division line present between a pair of the region boundary lines among the division lines and opens a second division line other than the first division line among the division lines, the separating section 19 that separates regions in the image frames in units of a region surrounded by the first division line, and the first depth-value giving section 20 that gives, to the region surrounded by the first division line, a depth value representing a distance degree of the region. The computer program can be stored in the information recording medium 30 and distributed independently from the computer. It is also possible to store the computer program in a server, access the server from the computer through a line such as the Internet, download the computer program from the server, and execute the computer program with the computer, and cause the computer to function as the image processing apparatus 1. The same applies to the computer program explained below.

An embodiment of the computer program for image processing according to the present invention may be a program for further causing the computer to execute a function of the start-point generating section 21 that generates a plurality of start points on the region boundary line.

An embodiment of the computer program for image processing according to the present invention may be a program in which the region-boundary-line-information receiving section 16 is configured to receive information concerning the region boundary line indicated targeting an object other than a background. The program further causes the computer to execute functions of the background-boundary-line-information receiving section 16 that receives information concerning a background boundary line indicated targeting the background in the image frame, the second depth-value giving section 23 that gives, to a region surrounded by the background boundary line, a depth value representing a distance degree of the region, and the object/background combining section 25 that combines the object to which the depth value is given by the first depth-value giving section 20 and the background to which the depth value is given by the second depth-value giving section 23.

An embodiment of the computer program for image processing according to the present invention may be a program for causing the computer to further execute functions of the location-point-presence/absence discriminating section 26 that discriminates that a plurality of objects and/or an intra-background region forming a background is present in the image frame and a location point indicating positions of the objects and/or a position of the intra-background region in the background is present, the object-predetermined-part-position specifying section 27 that specifies a position of a predetermined part of the plurality of objects and/or the intra-background region forming the background when the location point is present, and the depth-value determining section 28 that determines, on the basis of the position specified by the object-predetermined-part-position specifying section 27, a depth value representing a distance degree of the objects and/or the intra-background region. The depth value is given to the objects and/or the intra-background region by the first depth-value giving section 20 and/or the second depth-value giving section 23.

3. Other Embodiments

The present invention is not limited to the image processing apparatus, the image processing method, the computer program for image processing, and the information recording medium having stored therein the computer program according to the embodiment and can be variously changed and implemented.

For example, the background-boundary-line-information receiving section 22, the second depth-value giving section 23, the object/background separating section 24, and the object/background combining section 25 are not essential components for the image processing apparatus 1 and do not have to be included in the image processing apparatus 1. When the sections are not included in the image processing apparatus 1, when 3D processing is necessary for the background and the intra-background region as well, image processing same as the image processing for the objects can be performed. The location-point-presence/absence discriminating section 26, the object-predetermined-part-position specifying section 27, and the depth-value determining section 28 are not essential components for the image processing apparatus 1 either and do not have to be included in the image processing apparatus 1. When the sections are not included in the image processing apparatus 1, the depth value given to the objects or the intra-background region can be manually given by the operator. The constituent sections 16 to 28 and the steps executed by the constituent sections 16 to 28 may execute the functions for only a part of still images (also referred to as key frames) forming a moving image on the basis of a manual input by the operator and do not need to have functions for all the still images.

B Second Embodiment

A second embodiment of the present invention is explained with reference to the drawings.

1. An Image Processing Apparatus and an Image Processing Method

Figure 10:
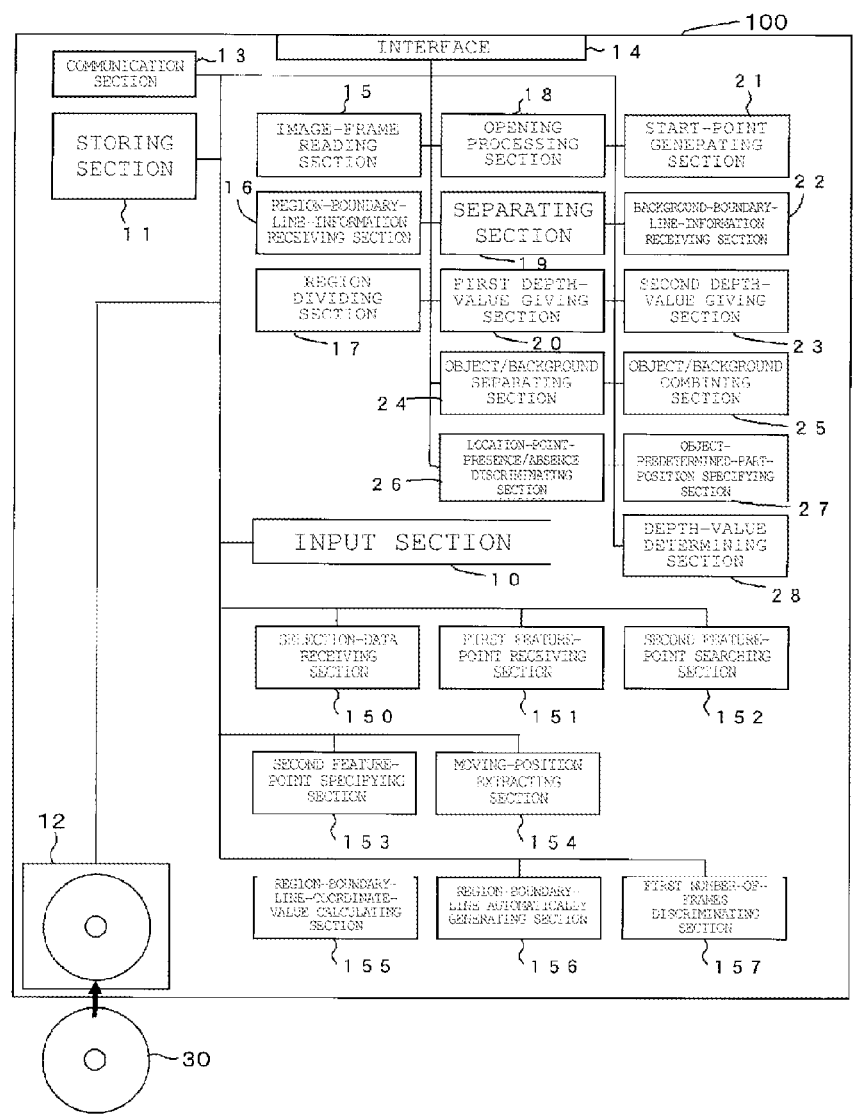
FIG. 10 shows a schematic diagram of an image processing apparatus according to a second embodiment of the present invention.

FIG. 10 shows a schematic diagram of an image processing apparatus according to the second embodiment of the present invention.

An image processing apparatus 100 according to this embodiment includes the input section 10, the storing section 11, the external-memory loading section 12, the communication section 13, the interface 14, the image-frame reading section 15, the region-boundary-line-information receiving section 16, the region dividing section 17, the opening processing section 18, the separating section 19, the first depth-value giving section 20, the start-point generating section 21, the background-boundary-line-information receiving section 22, the second depth-value giving section 23, the object/background separating section 24, the object/background combining section 25, the location-point-presence/absence discriminating section 26, the object-predetermined-part-position specifying section 27, and the depth-value determining section 28 included in the image processing apparatus in the first embodiment. In addition to the constituent sections, the image processing apparatus 100 further includes a selection-data receiving section 150, a first feature-point receiving section 151, a second feature-point searching section 152, a second feature-point specifying section 153, a moving-position extracting section 154, a region-boundary-line-coordinate-value calculating section 155, a region-boundary-line automatically generating section 156, and a first number-of-frames discriminating section 157. However, the second feature-point searching section 152 is not an essential component and does not have to be provided. Further, the first number-of-frames discriminating section 157 is not an essential component either and does not have to be provided. As explained in the first embodiment, the constituent sections are segmented according to functions of the constituent sections and shown. The constituent sections do not always mean physically segmented hardware.

The image processing apparatus 100 is an apparatus that makes it possible to automatically generate, among the plurality of image frames forming the moving image, when a first image frame, in which the region boundary line is already generated, is present, the region boundary line in a second image frame that is present later than the first image frame in time series.

The selection-data receiving section 150 is a part that generates a region boundary line (also referred to as "roto brush") in an object (e.g., a person or a part of the person such as an arm) in the first image frame and thereafter receives a signal in which a portion surrounded by the region boundary line is specified by a user. As an option, the selection-data receiving section 150 also functions as a portion that receives designation of the number of frames on which the automatic generation function of the region boundary line is executed.

The first feature-point receiving section 151 is a portion functioning as first feature-point receiving means for receiving a coordinate value of a first feature point present in the region boundary line of the first image frame.

The second feature-point searching section 152 is a portion functioning as second feature-point searching means for searching for, prior to processing of the second feature-point specifying section 153 explained below, a second feature point corresponding to the coordinate value of the first feature point on the basis of an approximation degree of at least one of a color and brightness of a pixel. The search for the second feature point is performed from a viewpoint of searching for a pixel, at least one of a color and brightness of which is closest to a color and brightness of one or two or more pixels present in a range of the first feature point. It is more accurate to search for a pixel closest from the viewpoints of both of the color and the brightness. However, depending on a situation, for an increase in speed of the search, the second feature points can be searched from the viewpoint of only the color or only the brightness. When the first feature point includes a plurality of pixels, information concerning the plurality of pixels are combined and the second feature point most approximate to the information is searched.

The second feature-point specifying section 153 is a portion functioning as second feature-point specifying means for specifying a coordinate value of the second feature point corresponding to the coordinate value of the first feature point. The second feature-point specifying section 153 determines the second feature point on the basis of the search by the second feature-point searching section 152.

The moving-position extracting section 154 is a constituent section that extracts position information of one or two or more pixels (suitably a coordinate, however, besides the coordinate, a distance and a direction may be adopted) forming the second feature point. Note that the function of the moving-position extracting section 154 may be imparted to the second feature-point specifying section 153 not to separately provide the moving-position extracting section 154.

The region-boundary-line-coordinate-value calculating section 155 is a portion that adds the position information extracted by the moving-position extracting section 154 to coordinates of a plurality of pixels forming the region boundary line in the first image frame and calculates coordinates of a plurality of pixels forming a new region boundary line in the second image frame (i.e., a region boundary line that slightly changes from the region boundary line in the first image frame). Note that the function of the region-boundary-line-coordinate-value calculating section 155 may be imparted to the region-boundary-line automatically generating section 156 not to separately provide the region-boundary-line-coordinate-value calculating section 155.

The region-boundary-line automatically generating section 156 is a portion functioning as region-boundary-line automatically generating means for automatically generating, on the basis of movement information from the first feature point to the second feature point, a new region boundary line corresponding to the region boundary line of the first image frame in the second image frame.

The first number-of-frames discriminating section 157 is a portion functioning as number-of-frames discriminating means for discriminating whether the number of image frames on which the processing for automatically generating a new region boundary line is executed has reached the designated number of image frames when the selection-data receiving section 150 receives designation of the number of frames on which the region-boundary-line automatically generating function is executed. At least the first feature-point receiving section 151, the second feature-point specifying section 153, and the region-boundary-line automatically generating section 156 execute the respective kinds of processing until the first number-of-frames discriminating section 157 discriminates that the number of image frames on which the processing for automatically generating a new region boundary line is executed has reached the designated number of image frames.

Figure 11A:
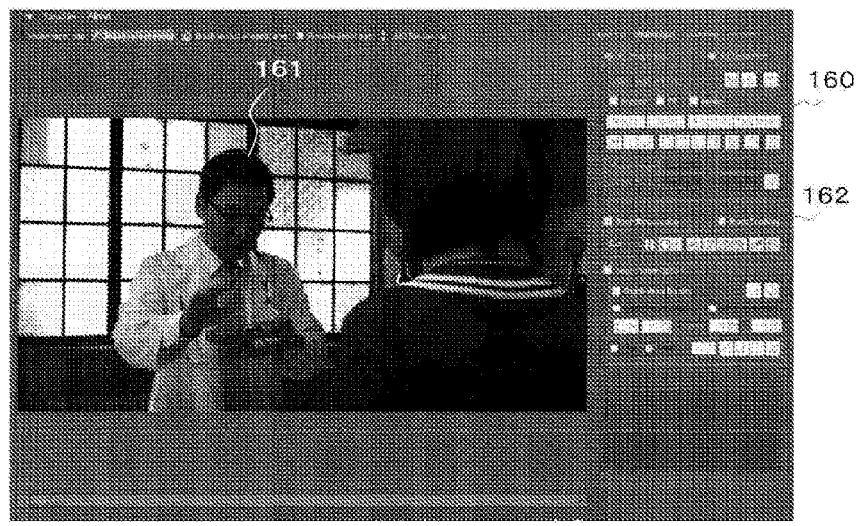
FIGS. 11A and 11B show diagrams for explaining an example of processing using the image processing apparatus shown in FIG. 10.
Figure 11B:
Figure 12:
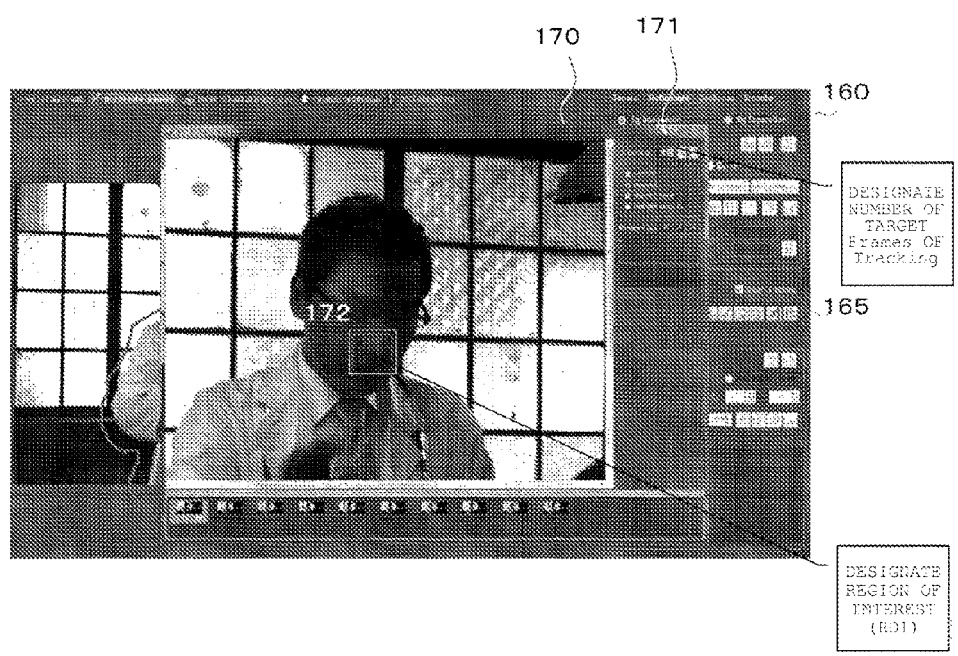
FIG. 12 shows a diagram following FIGS. 11A and 11B.

FIGS. 11A and 11B show diagrams for explaining an example processing performed using the image processing apparatus shown in FIG. 10. FIG. 12 shows a diagram following FIGS. 11A and 11B.

FIG. 11A indicates a state before a region boundary line (roto brush) is generated in a chemistry teacher (a kind of an object) in one screen example 160. FIG. 11B in the figure indicates a state after the roto brush is executed. When the roto brush is performed, the user performs operation for checking a checkbox 162 in the screen example 160. Subsequently, the user manually draws a roto brush 163 in the outer periphery of the chemistry teacher 161.

Subsequently, when the user indicates a key of a tracking window 165 on the screen example 160, another screen 170 shown in FIG. 12 is displayed. On the screen 170, a region 171 for designating the number of image frames for which the roto brush is automatically generated is present. When, for example, "3" is input to the region 171, automatic generation of the roto brush can be executed up to third image frame including the screen example 160 currently being operated. Subsequently, on the screen 170, the user designates a first feature point (also referred to as "region of interest") 171. As a result, the image processing apparatus 100 searches for a second feature point approximate to the first feature point 171. This function is explained in detail below.

Figure 13A:
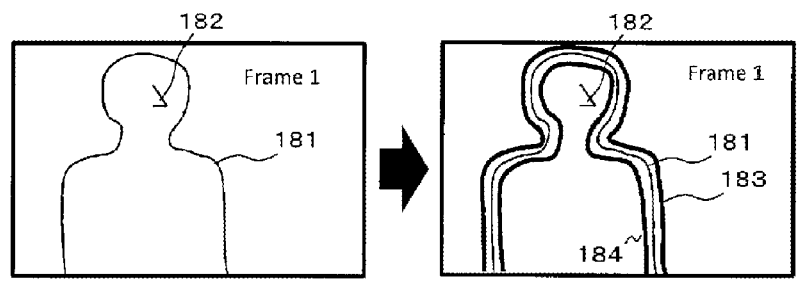
FIGS. 13A-13C show diagrams for explaining, in detail, an image processing method using the image processing apparatus shown in FIG. 10.
Figure 13B:
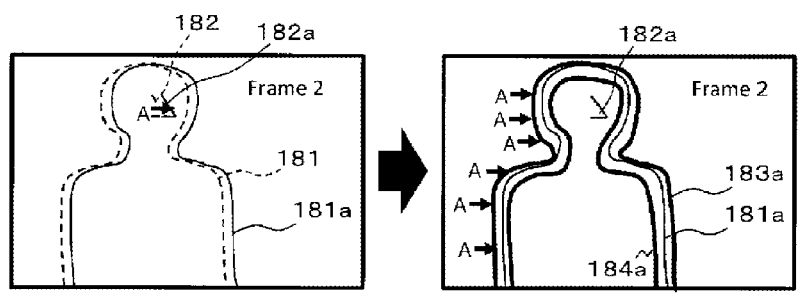
Figure 13C:
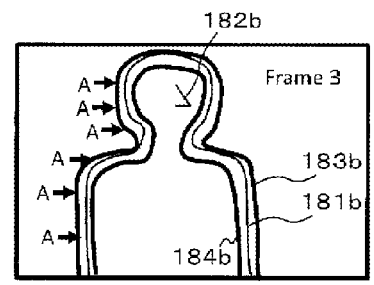
Figure 13C:
Figure 14:
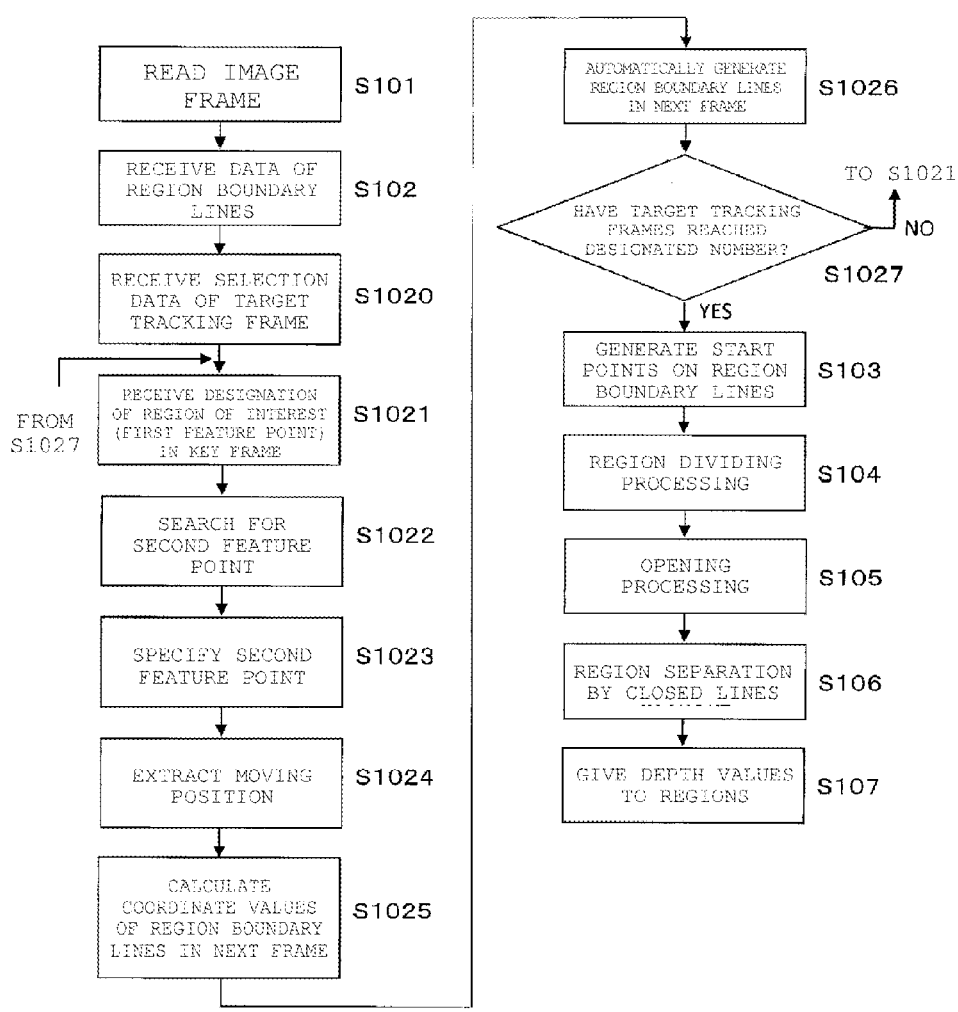
FIG. 14 shows a flowchart for explaining a flow of processing of the image processing method using the image processing apparatus shown in FIG. 10.

FIGS. 13A-13C show diagrams for explaining in detail an image processing method using the image processing apparatus shown in FIG. 10. FIG. 14 shows a flowchart for explaining a flow of processing of the image processing method using the image processing apparatus shown in FIG. 10.

The image processing method in this embodiment is a method that makes it possible to automatically generate, among the plurality of image frames forming the moving image, when a first image frame, in which the region boundary line is already generated, is present, the region boundary line in a second image frame that is present later than the first image frame in time series. In FIG. 14, the image processing method is shown as a plurality of steps performed between step 102 (S102) and step 103 (S103) shown in FIG. 6.

(Step 1020: A Number-of-Image-Frames-Designation Receiving Step)

In this embodiment, this step is a step of receiving selection data of a target tracking frame. More specifically, this step includes a number-of-image-frames-designation receiving step for receiving designation of the number of image frames on which processing by a region-boundary-line automatically generating step explained in detail below is executed. This step is equivalent to a step of receiving a numerical value input to the region 171 shown in FIG. 12.

(Step 1021: A First Feature-Point Receiving Step)

A first feature-point receiving step is a step of receiving a coordinate value of a first feature point (also referred to as "region of interest") present in the region boundary line of the first image frame. In FIG. 13A, an object (a person) 181 is present in a frame 1 serving as a key frame. A nose 182 is illustrated as the first feature point. The frame 1 is a frame on which the user manually performed a roto brush. Roto brushes 183 and 814 (i.e., a region boundary line 183 and a region boundary line 184) are already drawn on the outer side and the inner side of the contour of the object 181. In FIG. 13B, a frame 2 displayed immediately after the frame 1 in time series is displayed. In the frame 2, an object 181a (indicated by a thin solid line in the frame 2 in 13B), which is the object 181 (indicated by a dotted line in the frame 2 in 13B) in the frame 1 slightly moving to the right, is present.

(Step 1022: A Second Feature-Point Searching Step)

A second feature-point searching step is a step of searching for searching for, prior to processing in a second feature-point specifying step explained below, a second feature point corresponding to the coordinate value of the first feature point (in FIGS. 13A-13C, the nose 182) on the basis of an approximation degree of at least one of a color and brightness of a pixel.

(Step 1023: A Second Feature-Point Specifying Step)

A second feature-point searching step is a step of specifying a coordinate value of the second feature point corresponding to the coordinate value of the first feature point in the second image frame (in FIG. 13B, equivalent to the frame 2). The nose 182 serving as the first feature point moves in a direction of an arrow A in the frame 2. Therefore, the second feature-point specifying section 153 specifies a nose 182a in the frame 2 as the second feature point.

(Step 1024: A Moving-Position Extracting Step)

A moving-position extracting step is a step of extracting a coordinate of one or two or more pixels forming the second feature point (the nose 182a) with the moving-position extracting section 154.

(Step 1025: A New Region-Boundary-Line-Coordinate-Value Calculating Step)

A new-region-boundary-line-coordinate-value calculating step is a step of adding position information extracted by the moving-position extracting step to coordinates of a plurality of pixels forming the region boundary lines 183 and 184 in the first image frame (the frame 1 serving as the key frame) and calculating coordinate values of a plurality of pixels forming new region boundary lines 183a and 184a in the second image frame (the frame 2 serving as the next frame). In this step, a direction and a distance of movement of the nose 182 to the nose 182a are added to the coordinates of the pixels forming the region boundary lines 183 and 184 to calculate the coordinate values of the pixels forming the new region boundary lines 183a and 184a.

(Step 1026: A Region-Boundary-Line Automatically Generating Step)

A region-boundary-line automatically generating step is a step of automatically generating, on the basis of movement information from the first feature point (the nose 182) to the second feature point (the nose 182a), the new region boundary lines 183a and 184a corresponding to the region boundary lines 183 and 184 of the first image frame (the frame 1) in the second image frame (the frame 2). The region-boundary-line automatically generating step is a step of performing processing for connecting the pixels having the new coordinates calculated by the new-region-boundary-line-coordinate-value calculating step.

(Step 1027: A Number-of-Frames Discriminating Step)

A number-of-frames discriminating step is a step of discriminating whether the number of image frames on which the processing for automatically generating the new region boundary lines 183 and 184 has reached a designated number of image frames. If the number of image frames has not reached the designated number of frames, the processing shifts to step 1021 (S1021). The key frame is switched to the frame 2. The same processing in step 1021 (S1021) and subsequent steps is performed. In this case, in the designation of the first feature point in step 1021 (S1021), since the coordinate of the nose 182a serving as the second feature point is already specified, the first feature-point receiving section 151 receives the nose 182a as the first feature point without waiting for new designation from the user. The processing in step 1022 (S1022) to step 1027 (S1027) is executed on the next frame (in FIG. 13C, a frame 3).

As a result, new region boundary lines 183b and 184b are automatically generated on the outer side and the inner side of an object (a person) 181b. Such a series of processing is automatically performed until processing of a designated number of frames is completed. If the second feature point is clear without necessity of a search, the user designates the second feature point to make it unnecessary to perform the second feature-point searching step (S1022). When step S1024 is included in step S1023 and step S1025 is included in step S1026, the processing can also shift to step 1026 (S1026) after step 1023 (S1023). Therefore, at least the first feature-point receiving step, the second feature-point specifying step, and the region-boundary-line automatically generating step can be executed until it is discriminated by the number-of-frames discriminating step that the number of image frames has reached the designated number of image frames. When the processing for the designated number of frames is completed in step 1027 (S1207), the processing shifts to step 103 (S103).

2. A Computer Program for Image Processing and an Information Recording Medium Having the Computer Program for Image Processing Stored Therein An embodiment of a computer program for image processing according to the present invention is a program read and executed by the image processing apparatus 100 (referred to as computer), the program causing the computer to execute functions of the image-frame reading section 15 that reads one or two or more image frames among a plurality of image frames forming a moving image, the region-boundary-line-information receiving section 16 that receives information concerning a region boundary line in the read image frames, the region dividing section 17 that expands a division region starting from a predetermined point on the region boundary line and divides the inside and the outside of the region boundary line with division lines, which connect approximate points of brightness, the opening processing section 18 that leaves a first division line present between a pair of the region boundary lines among the division lines and opens a second division line other than the first division line among the division lines, the separating section 19 that separates regions in the image frames in units of a region surrounded by the first division line, and the first depth-value giving section 20 that gives, to the region surrounded by the first division line, a depth value representing a distance degree of the region and, in addition, the first feature-point receiving section 151 that receives a coordinate value of a first feature point present in the region boundary line of the first image frame, the second feature-point specifying section 153 that specifies a coordinate value of a second feature point corresponding to the coordinate value of the first feature point in the second image frame, and the region-boundary-line automatically generating section 156 that automatically generates, on the basis of movement information from the first feature point to the second feature point, a new region boundary line corresponding to the region boundary line of the first image frame in the second image frame. The computer program can be stored in the information recording medium 30 and distributed independently from the computer. It is also possible to store the computer program in a server, access the server from the computer through a line such as the Internet, download the computer program from the server, and execute the computer program with the computer, and cause the computer to function as the image processing apparatus 100. The same applies to the computer program explained below.

An embodiment of the computer program for image processing according to the present invention further causes the computer (the image processing apparatus 100) to execute the function of the second feature-point searching section 152 that searches for, prior to the processing of the second feature-point specifying section 153, the second feature point corresponding to the coordinate value of the first feature point on the basis of an approximation degree of at least one of a color and brightness of a pixel.

An embodiment of the computer program for image processing according to the present invention is a program for further causing the computer (the image processing apparatus 100) to executes the functions of the selection-data receiving section 150 functioning as number-of-image-frames-designation receiving means for receiving designation of the number of image frames on which processing by the region-boundary-line automatically generating section 156 is executed and the first number-of-frames discriminating section 157 that discriminates whether the number of image frames on which the processing for automatically generating a new region boundary line is executed has reached the designated number of image frames. The program causes at least the first feature-point receiving section 151, the second feature-point specifying section 153, and the region-boundary-line automatically generating section 156 to execute the respective kinds of processing until the first number-of-frames discriminating section 157 discriminates that the number of image frames has reached the designated number of image frames.

3. Other Embodiments

The present invention is not limited to the image processing apparatus, the image processing method, the computer program for image processing, and the information recording medium having stored therein the computer program according to the embodiment and can be variously changed and implemented.

For example, the second feature-point searching section 152 functioning as the second feature-point searching means may search for the second feature point corresponding to the coordinate value of the first feature point not on the basis of an approximation degree of at least one of a color and brightness of a pixel and on the basis of information concerning the other pixels such as light and shade of a color. The selection-data receiving section 150 does not have to function as the number-of-image-frames-designation receiving means. When the selection-data receiving section 150 does not function as the number-of-image-frames-designation receiving means, the first number-of-frames discriminating section 157 functioning as the number-of-frames discriminating means does not have to be provided. However, even when the selection-data receiving section 150 does not function as the number-of-image-frames-designation receiving means, the first number-of-frames discriminating section 157 may be provided to end the processing at a predetermined number of image frames.

C Third Embodiment

A third embodiment of the present invention is explained with reference to the drawings.

1. An Image Processing Apparatus and an Image Processing Method

Figure 15:
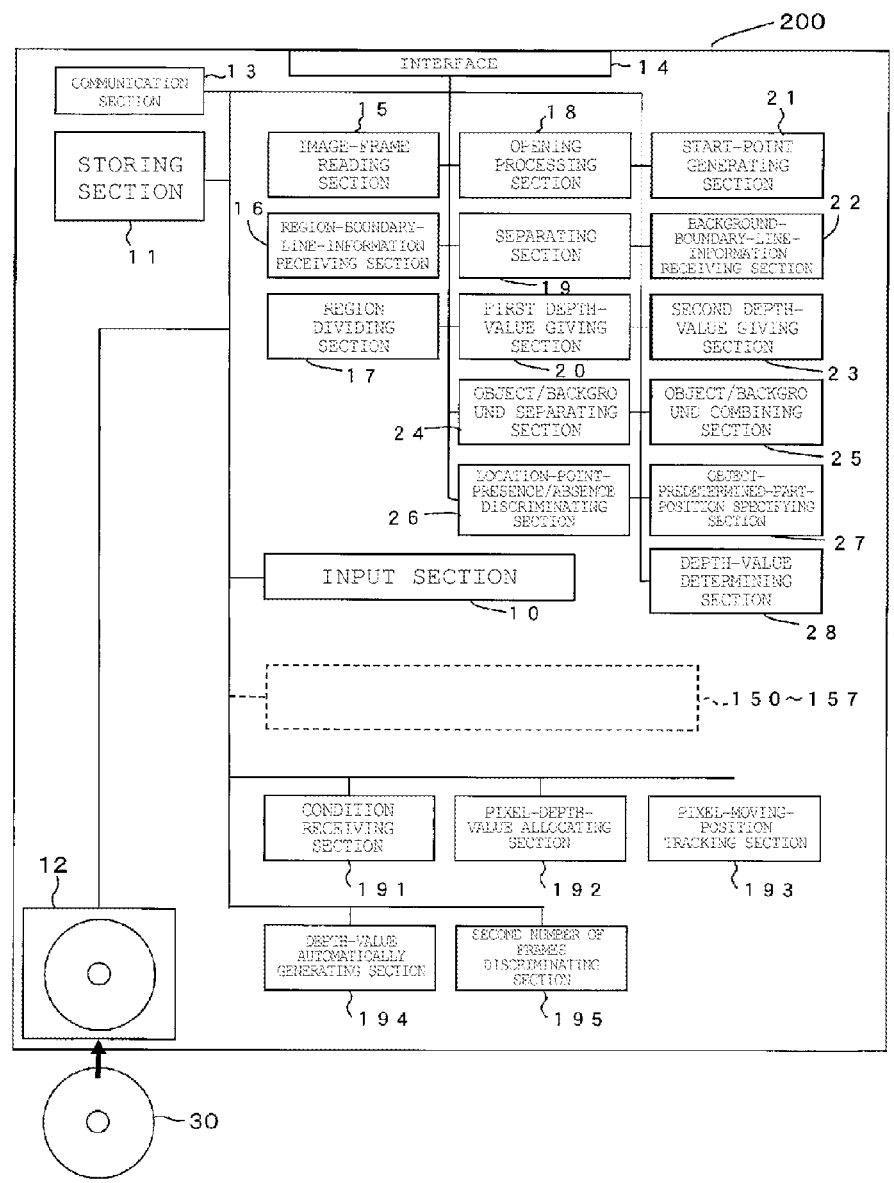
FIG. 15 shows a schematic diagram of an image processing apparatus according to a third embodiment of the present invention.

FIG. 15 shows a schematic diagram of an image processing apparatus according to a third embodiment of the present invention.

An image processing apparatus 200 according to this embodiment includes the input section 10, the storing section 11, the external-memory loading section 12, the communication section 13, the interface 14, the image-frame reading section 15, the region-boundary-line-information receiving section 16, the region dividing section 17, the opening processing section 18, the separating section 19, the first depth-value giving section 20, the start-point generating section 21, the background-boundary-line-information receiving section 22, the second depth-value giving section 23, the object/background separating section 24, the object/background combining section 25, the location-point-presence/absence discriminating section 26, the object-predetermined-part-position specifying section 27, and the depth-value determining section 28 included in the image processing apparatus in the first embodiment. In addition to the constituent sections, the image processing apparatus 200 further includes a condition receiving section 191, a pixel-depth-value allocating section 192, a pixel-moving-position tracking section 193, a depth-value automatically generating section 194, and a second number-of-frames discriminating section 195. Note that, as an option, when the image processing apparatus 200 performs automatic generation of a roto brush as well, the image processing apparatus 200 may also include the selection-data receiving section 150, the first feature-point receiving section 151, the second feature-point searching section 152, the second feature-point specifying section 153, the moving-position extracting section 154, the region-boundary-line-coordinate-value calculating section 155, the region-boundary-line automatically generating section 156, and the first number-of-frames discriminating section 157 included in the image processing apparatus 100 according to the second embodiment. Therefore, in FIG. 15, the constituent sections 150 to 157 peculiar to the second embodiment are shown in a range surrounded by a dotted line. As explained in the first embodiment and the second embodiment, the constituent sections are segmented according to functions of the constituent sections and shown. The constituent sections do not always mean physically segmented hardware.

The image processing apparatus 200 is an apparatus that makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series.

The condition receiving section 191 is a portion that receives a condition for automatically generating the depth value. The condition receiving section 191 also functions as a portion that receives designation of the number of frames on which the depth-value automatically generating function is executed.

The pixel-depth-value allocating section 192 is a portion functioning as pixel-depth-value allocating means for allocating, to one or more first pixels present in the region surrounded by the first division line in the first image frame, the depth value given to the region surrounded by the first division line. For example, when one hundred pixels are present in the region surrounded by the first division line, the pixel-depth-value allocating section 192 allocates, to the one hundred pixels, the depth value given to the region surrounded by the first division line.

The pixel-moving-position tracking section 193 is a portion functioning as pixel-moving-position tracking means for tracking the first pixels to find to which pixels in the second image frame the first pixels move. When one hundred pixels (first pixels) are present in the region surrounded by the first division line, the pixel-moving-position tracking section 193 individually searches to which of pixels (second pixels) in the second image frame the one hundred first pixels correspond. The search is performed from the viewpoint of searching for second pixels, at least one of a color and brightness of which is closest to a color or brightness of each of the first pixels. It is more accurate to search for the second pixel closest to the first pixel from the viewpoints of both of the color and the brightness. However, depending on a situation, for an increase in speed of the search, the second feature points can be searched from the viewpoint of only the color or only the brightness. In some case, according to the search, the second pixel corresponding to the first pixel is absent and the number of second pixels corresponding to the one hundred first pixels is ninety-nine. However, since movement of the pixels between frames close to each other in time series is checked, a change in the number of pixels between the frames is extremely small. Therefore, the change in the number of pixels does not cause a problem.

The depth-value automatically generating section 194 is a portion functioning as depth-value automatically generating means for automatically generating a depth value allocated by the pixel-depth-value allocating means to a region in the second image frame, that is, a region formed by second pixels after the movement of the first pixels. Consequently, for example, when the number of second pixels corresponding to one hundred pixels in the first image frame is ninety-nine, the depth value same as the depth value of the first pixels is generated for the ninety-nine second pixels. This means that the same depth value is given to a region formed by the ninety-nine second pixels. Therefore, if regions obtained by dividing an object or objects with division lines and the depth value is given to the regions in a key frame (e.g., a first image frame), the depth value can be automatically given to a frame next to the key frame in time series even if work for giving at least the depth value of the region boundary line and the depth value is not manually performed.

The second number-of-frames discriminating section 195 is a portion that discriminates whether the number of image frames on which the processing for automatically generating the depth value is executed has reached a designated number of image frames when the condition receiving section 191 receives designation of the number of frames on which the depth-value automatically generating function is executed. At least the pixel-depth-value allocating section 192, the pixel-moving-position tracking section 193, and the depth-value automatically generating section 194 execute the respective kinds of processing until the second number-of-frames discriminating section 195 discriminates that the number of image frames has reached the designated number of image frames.

Figure 16A:
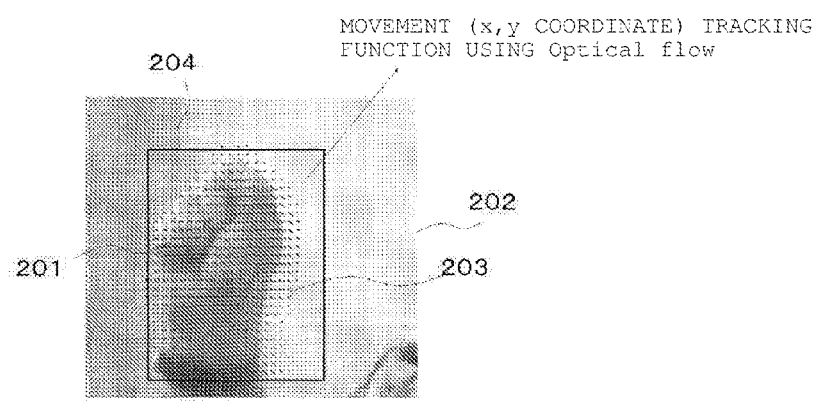
FIGS. 16A and 16B show diagrams for explaining an example of processing using the image processing apparatus shown in FIG. 15.
Figure 16B:
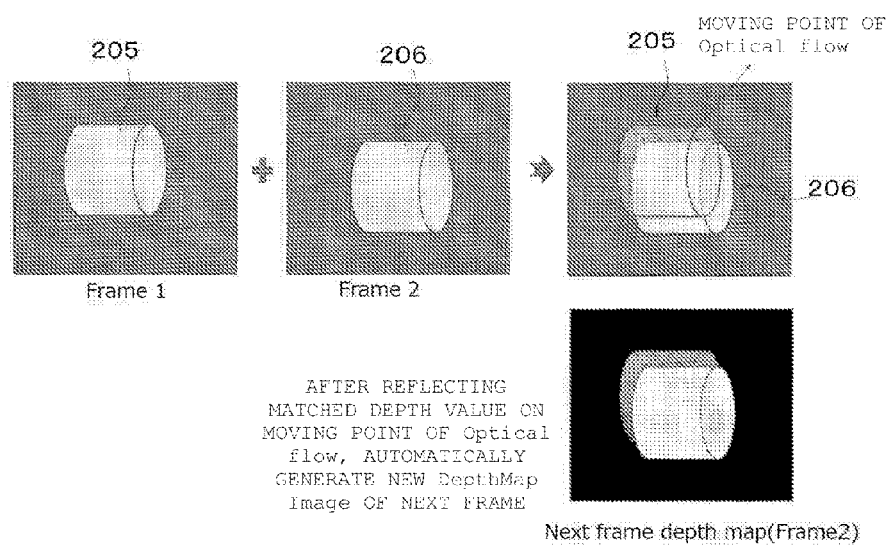
Figure 17:
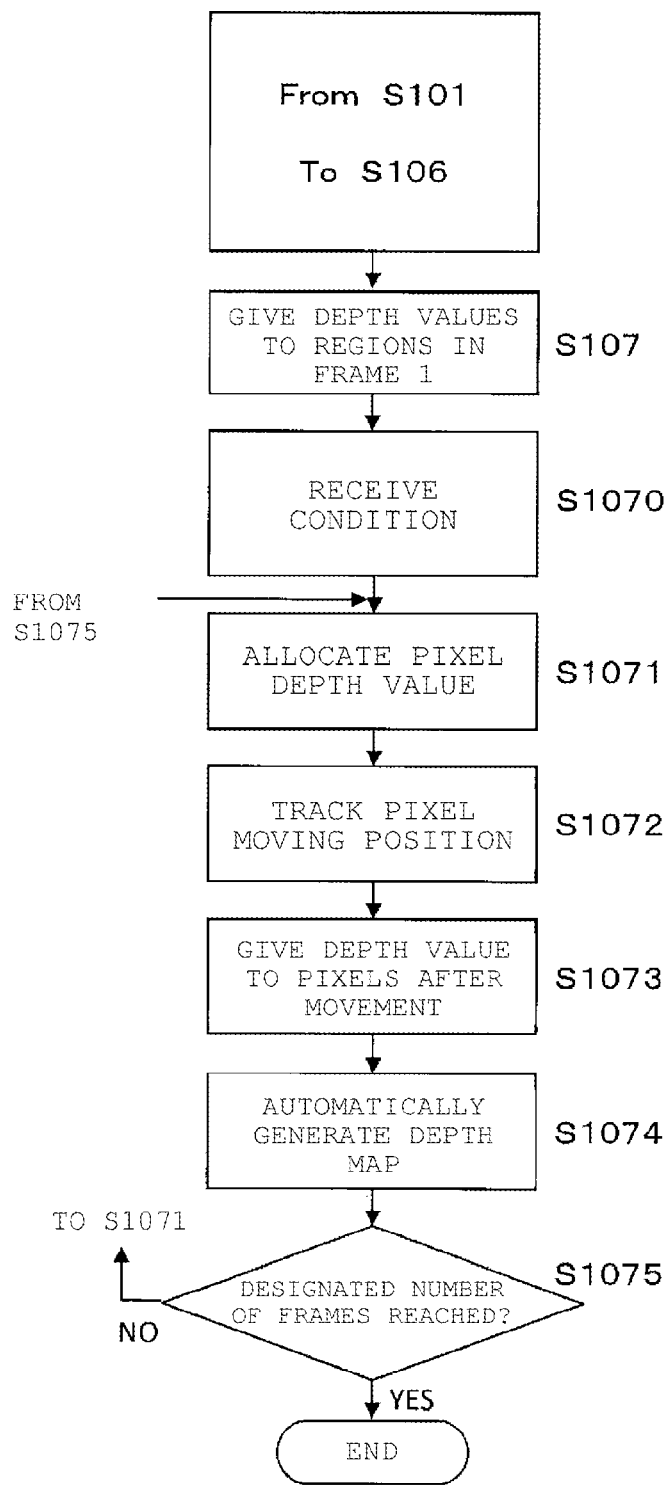
FIG. 17 is a flowchart for explaining a flow of processing of an image processing method using the image processing apparatus shown in FIG. 15.

FIGS. 16A and 16B show diagrams for explaining an example of processing performed using the image processing apparatus shown in FIG. 15. FIG. 17 is a flowchart for explaining a flow of processing of an image processing method using the image processing apparatus shown in FIG. 15.

The image processing method in this embodiment is an image processing method that makes it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series. In FIG. 17, the image processing method is shown as a plurality of steps performed following step 106 (S106) in FIG. 6. Note that the processing up to step 106 (S106) in FIG. 6 and the processing in step 107 (S107) in FIG. 17 can be performed on only one or two or more image frames (referred to as "key frames") rather than all the image frames forming the moving image. Processing in step 1070 and subsequent steps in FIG. 17 can be performed on the key frames and the subsequent image frames or the image frames between the key frames.

FIG. 16A is an image frame 202 showing a clenched hand 201. In an image frame next to the image frame 202 in time series, a state is shown in which the clenched hand 201 moves to a region 203 indicated by dots (refer to movement in a frame 204). It is possible to track each of pixels forming an image of the clenched hand 201 to find to which of pixels in the next image frame the pixel moves and specify that the clenched hand 201 moves to the region 203.

FIG. 16B shows a state in which a column 205 drawn in the frame 1 moves to a position of a column 206 (obliquely right downward) in the next frame (the frame 2). If a human determine the movement with the eyes, the human can easily estimate that the column 205 moves to the column 206. However, a computer cannot perform the estimation unless there is any clue. Therefore, the computer determines, using an optical flow algorithm, to which pixels respective pixels forming the column 205 in the frame 1 move in the frame 2. This algorithm is a program for collating the pixels forming the column 205 with all the pixels in the frame 2 on the basis of pixel information such as colors or brightness of the respective pixels forming the column 205 and selecting pixels most approximate to the pixel information. According to the program, it is possible to grasp where in the frame 2 the column 205 moves to. In an example shown in FIG. 16B, it can be grasped that a region after the movement of the column 205 is the column 206. Depth values are given to the pixels forming the column 205. Therefore, the same depth values can be given to the pixels forming the column 206. As a result, the depth value can be automatically given to the column 206. For example, if the column 205 is formed by ten division regions, the column 206 also includes ten division regions. Depth values same as depth values of the division regions of the column 206 can be given to the division regions of the column 206.

An advantage of the image processing method using the image processing apparatus 200 according to the third embodiment is that processing of region division in an object or between objects does not have to be performed on the key frames and subsequent image frames. If only the region division and the giving of the depth value are performed on the key frames, positions after movement can be searched in pixel units in the key frames and subsequent image frames. Therefore, in the example shown in FIG. 16B, it is unnecessary to always trim a region in the column 206. However, in the case of still images forming a moving image, images are sometimes greatly changed between image frames. Therefore, it is desirable to perform positioning with the key frames, the region division, and the giving of depth values on some image frames in time series.

A flow of a preferred image processing method is explained with reference to FIG. 17.

(Step 107: A First Depth-Value Giving Step)

In this embodiment, this step is a step of giving depth values to regions (vision regions of an object) in the frame 1 serving as a key frame. In this step, the depth values are given according to determination by human eyes in the manner explained in the first embodiment.

(Step 1070: A Condition Receiving Step)

This step is the processing executed by the condition receiving section 191.

(Step 1071: A Pixel-Depth-Value-Allocating Step)

This step is a step executed by the pixel-depth-value allocating section 192 to allocate, to one or more first pixels present in the region surrounded by the first division line in the first image frame, a depth value given to the region surrounded by the first division line.

(Step 1072: A Pixel-Moving-Position Tracking Step)

This step is a step executed by the pixel-moving-position tracking section 193 to track the first pixel to find to which pixel in the second image frame the first pixel moves.

(Step 1073: A Pixel-Depth-Value-after-Movement Giving Step)

This step is a step of giving, to a new pixel that can be found in the second image frame, a depth value of a pixel in the first image frame corresponding to the new pixel. This step can be executed by the depth-value automatically generating section 194. However, it is also possible that a constituent section (a pixel-depth-value-after-movement giving section) separate from the depth-value automatically generating section 194 is provided and the step is executed by the pixel-depth-value-after-movement giving section.

(Step 1074: A Depth-Value Automatically Generating Step)

This step is a step executed by the depth-value automatically generating section 194 to automatically generate the depth value automatically allocated by the pixel-depth-value allocating step to a region in the second image frame, that is, a region formed by the second pixels after the movement of the first pixels. In this step, the same depth value can also be given to the region formed by the second pixels on the basis of the depth value of the second pixels given through the pixel-depth-value-after-movement giving step. That is, the depth-value automatically generating section 194 and the depth-value automatically generating step executed by the depth-value automatically generating section 194 may be performed on the basis of the depth value allocated to the first pixels or may be performed on the basis of the depth value given to the second pixels.

(Step 1075: A Second Number-of-Frames Discriminating Step)

A second number-of-frames discriminating step is a step of discriminating whether the number of image frames on which the processing for automatically generating depth values is executed has reached a designated number of image frames. If the number of image frames has not reached the designated number of image frames, the processing shifts to step 1071 (S1071), the key frame is switched from the preceding image from to the next image frame in time series, and the same processing in step 1071 (S1071) and subsequent steps is performed. In this case, the allocation of the pixel depth value in step 1071 (S1071) is already performed in the preceding processing. Therefore, the pixel-depth-value allocating section 192 directly receives the depth value specified in the preceding processing. Thereafter, the processing in step 1072 (S1072) to step 1075 (S1075) is executed on the next image frame.

Such a series of processing is automatically performed until processing of a designated number of frames is completed. Therefore, at least the pixel-depth-value allocating step, the pixel-moving-position tracking step, the pixel-depth-value-after-movement giving step (sometimes included in the next depth-value automatically generating step), and the depth-value automatically generating step can be executed until it is determined by the second number-of-frames discriminating step that the number of image frames has reached the designated number of image frames. In step 1075 (S1075), when the processing of the designated number of frames is completed, the processing ends.

2. A Computer Program for Image Processing and an Information Recording Medium Having the Computer Program for Image Processing Stored Therein An embodiment of the computer program for image processing apparatus to the present invention is a program read and executed by the image processing apparatus 200 (referred to as computer), the program causing the computer to execute the functions of the image-frame reading section 15 that reads one or two or more image frames among a plurality of image frames forming a moving image, the region-boundary-line-information receiving section 16 that receives information concerning a region boundary line in the read image frames, the region dividing section 17 that expands a division region starting from a predetermined point on the region boundary line and divides the inside and the outside of the region boundary line with division lines, which connect approximate points of brightness, the opening processing section 18 that leaves a first division line present between a pair of the region boundary lines among the division lines and opens a second division line other than the first division line among the division lines, the separating section 19 that separates regions in the image frames in units of a region surrounded by the first division line, and the first depth-value giving section 20 that gives, to the region surrounded by the first division line, a depth value representing a distance degree of the region and, in addition, the pixel-depth-value allocating section 192 that allocates, to one or more first pixels present in the region surrounded by the first division line in the first image frame, the depth value given to the region surrounded by the first division line, the pixel-moving-position tracking section 193 that tracks the first pixels to find to which pixels in the second image frame the first pixels move, and the depth-value automatically generating section 194 that automatically generates a depth value allocated by the pixel-depth-value allocating section 192 to a region in the second image frame, that is, a region formed by second pixels after the movement of the first pixels.

The computer program for image processing can further cause the computer to execute the functions of the condition receiving section 191, the second number-of-frames discriminating section 195, and the pixel-depth-value-after-movement giving section for executing the pixel-depth-value-after-movement giving step. The computer program can be stored in the information recording medium 30 and distributed independently from the computer. It is also possible to store the computer program in a server, access the server from the computer through a line such as the Internet, download the computer program from the server, and execute the computer program with the computer, and cause the computer to function as the image processing apparatus 200.

3. Other Embodiments

The present invention is not limited to the image processing apparatus, the image processing method, the computer program for image processing, and the information recording medium having stored therein the computer program according to the embodiment and can be variously changed and implemented.

For example, the pixel-moving-position tracking section 193 functioning as the pixel-moving-position tracking means and the pixel-moving-position tracking step executed by the pixel-moving-position tracking section 193 may perform the tracking on the basis of other pixel information such as light and shade of a color of a pixel. The constituent sections in the image processing apparatuses 1, 100, and 200 in all the embodiments including this embodiment may be combined in any way except when the combination is impossible. Further, concerning the steps executed by the constituent sections, the order may be changed in any way except when the change is impossible. For example, in the second embodiment, step S1027 (see FIG. 14) may be moved to after step S107 and processing may return to the next step S1021 after the processing is completed up to the giving of the depth value in frame units.

INDUSTRIAL APPLICABILITY

The present invention can be used in production of a 3D video.

The invention claimed is:

1. An image processing apparatus comprising at least: image-frame reading means for reading one or two or more image frames among a plurality of image frames forming a moving image; region-boundary-line-information receiving means for receiving information concerning a region boundary line in the read image frames; region dividing means for expanding a division region starting from a predetermined point on the region boundary line and dividing an inside and an outside of the region boundary line with division lines, which connect approximate points of brightness; opening processing means for leaving a first division line present between a pair of the region boundary lines among the division lines and opening a second division line other than the first division line among the division lines; separating means for separating regions in the image frames in units of a region surrounded by the first division line; and first depth-value giving means for giving, to the region surrounded by the first division line, a depth value representing a distance degree of the region.

2. The image processing apparatus according to claim 1, further comprising start-point generating means for generating a plurality of the start points on the region boundary line.

3. The image processing apparatus according to claim 1, wherein the region-boundary-line-information receiving means is means for receiving information concerning the region boundary line indicated targeting an object other than a background, and the image processing apparatus at least comprises:

background-boundary-line-information receiving means for receiving information concerning a background boundary line indicated targeting the background in the image frame;

second depth-value giving means for giving, to a region surrounded by the background boundary line, a depth value representing a distance degree of the region; and object/background combining means for combining the object to which the depth value is given by the first depth-value giving means and the background to which the depth value is given by the second depth-value giving means.

4. The image processing apparatus according to claim 1, further comprising:

location-point-presence/absence discriminating means for discriminating that a plurality of objects and/or an intra-background region forming a background is present in the image frame and a location point indicating positions of the objects and/or a position of the intra-background region in the background is present;

object-predetermined-part-position specifying means for specifying a position of a predetermined part of the plurality of objects and/or the intra-background region forming the background when the location point is present; and depth-value determining means for determining, on the basis of the position specified by the object-predetermined-part-position specifying means, a depth value representing a distance degree of the objects and/or the intra-background region, wherein the first depth-value giving means and/or the second depth-value giving means gives the depth value to the objects and/or the intra-background region.

5. The image processing apparatus according to claim 1, the image processing apparatus making it possible to automatically generate, among the plurality of image frames forming the moving image, when a first image frame, in which the region boundary line is already generated, is present, the region boundary line in a second image frame that is present later than the first image frame in time series, and the image processing apparatus further comprising:

first feature-point receiving means for receiving a coordinate value of a first feature point present in the region boundary line of the first image frame;

second feature-point specifying means for specifying a coordinate value of a second feature point corresponding to the coordinate value of the first feature point in the second image frame; and region-boundary-line automatically generating means for automatically generating, on the basis of movement information from the first feature point to the second feature point, a new region boundary line corresponding to the region boundary line of the first image frame in the second image frame.

6. The image processing apparatus according to claim 5, further comprising second feature-point searching means for searching for, prior to processing of the second feature-point specifying means, the second feature point corresponding to the coordinate value of the first feature point on the basis of an approximation degree of at least one of a color and brightness of a pixel.

7. The image processing apparatus according to claim 5, further comprising:

number-of-image-frames-designation receiving means for receiving designation of a number of the image frames on which processing by the region-boundary-line automatically generating means is executed; and number-of-frames discriminating means for discriminating whether the number of image frames on which the processing for automatically generating a new region boundary line is executed has reached the designated number of image frames, wherein the first feature-point receiving means, the second feature-point specifying means, and the region-boundary-line automatically generating means execute the respective kinds of processing until the number-of-frames discriminating means discriminates that the number of image frames has reached the designated number of image frames.

8. The image processing apparatus according to claim 1, the image processing apparatus making it possible to automatically generate the depth value in a region corresponding to the region surrounded by the first division line in a second image frame in which a first image frame, in which the depth value is already given to the region surrounded by the first division line, is present and that is present later than the first image frame in time series among the plurality of image frames forming the moving image, and the image processing apparatus further comprising:

pixel-depth-value allocating means for allocating, to one or more first pixels present in the region surrounded by the first division line in the first image frame, the depth value given to the region surrounded by the first division line;

pixel-moving-position tracking means for tracking the first pixels to find to which pixels in the second image frame the first pixels move; and depth-value automatically generating means for automatically generating a depth value allocated by the pixel-depth-value allocating means to a region in the second image frame, that is, a region formed by second pixels after the movement of the first pixels.

9. An image processing method executed using the image processing apparatus according to claim 1, the image processing method executing at least:

an image-frame reading step for reading one or two or more image frames among a plurality of image frames forming a moving image;

a region-boundary-line-information receiving step for receiving information concerning a region boundary line in the read image frames;

a region dividing step for expanding a division region starting from a predetermined point on the region boundary line and dividing an inside and an outside of the region boundary line with division lines, which connect approximate points of brightness;

an opening processing step for leaving a first division line present between a pair of the region boundary lines among the division lines and opening a second division line other than the first division line among the division lines;

a separating step for separating regions in the image frames in units of a region surrounded by the first division line; and a first depth-value giving step for giving, to the region surrounded by the first division line, a depth value representing a distance degree of the region.

10. A non-transitory computer readable medium having stored therein as computer program read and executed by a computer, the non-transitory computer readable medium having stored therein the computer program for image processing for causing the computer to execute functions of means comprising: image-frame reading means for reading one or two or more image frames among a plurality of image frames forming a moving image; region-boundary-line-information receiving means for receiving information concerning a region boundary line in the read image frames; region dividing means for expanding a division region starting from a predetermined point on the region boundary line and dividing an inside and an outside of the region boundary line with division lines, which connect approximate points of brightness; opening processing means for leaving a first division line present between a pair of the region boundary lines among the division lines and opening a second division line other than the first division line among the division lines; separating means for separating regions in the image frames in units of a region surrounded by the first division line; and first depth-value giving means for giving, to the region surrounded by the first division line, a depth value representing a distance degree of the region.

11. The non-transitory computer readable medium having stored therein the computer program for image processing according to claim 10, further causing the computer to execute a function of start-point generating means for generating a plurality of the start points on the region boundary line.

12. The non-transitory computer readable medium having stored therein the computer program for image processing according to claim 10, wherein the region-boundary-line-information receiving means is means for receiving information concerning the region boundary line indicated targeting an object other than a background, and the computer program for image processing further causes the computer to execute functions of: background-boundary-line-information receiving means for receiving information concerning a background boundary line indicated targeting the background in the image frame; second depth-value giving means for giving, to a region surrounded by the background boundary line, a depth value representing a distance degree of the region; and object/background combining means for combining the object to which the depth value is given by the first depth-value giving means and the background to which the depth value is given by the second depth-value giving means.

13. The non-transitory computer readable medium having stored therein the computer program for image processing according to claim 10, causing the computer to execute functions of: location-point-presence/absence discriminating means for discriminating that a plurality of objects and/or an intra-background region forming a background is present in the image frame and a location point indicating positions of the objects and/or a position of the intra-background region in the background is present; object-predetermined-part-position specifying means for specifying a position of a predetermined part of the plurality of objects and/or the intra-background region forming the background when the location point is present; and depth-value determining means for determining, on the basis of the position specified by the object-predetermined-part-position specifying means, a depth value representing a distance degree of the objects and/or the intra-background region, wherein the first depth-value giving means and/or the second depth-value giving means gives the depth value to the objects and/or the intra-background region.

14. The non-transitory computer readable medium having stored therein the computer program for image processing according to claim 10, the computer program for image processing making it possible to automatically generate, among the plurality of image frames forming the moving image, when a first image frame, in which the region boundary line is already generated, is present, the region boundary line in a second image frame that is present later than the first image frame in time series, and the computer program for image processing causing the computer to execute functions of: first feature-point receiving means for receiving a coordinate value of a first feature point present in the region boundary line of the first image frame; second feature-point specifying means for specifying a coordinate value of a second feature point corresponding to the coordinate value of the first feature point in the second image frame; and region-boundary-line automatically generating means for automatically generating, on the basis of movement information from the first feature point to the second feature point, a new region boundary line corresponding to the region boundary line of the first image frame in the second image frame.

15. The non-transitory computer readable medium having stored therein the computer program for image processing according to claim 14, further causing the computer to execute a function of second feature-point searching means for searching for, prior to processing of the second feature-point specifying means, the second feature point corresponding to the coordinate value of the first feature point on the basis of an approximation degree of at least one of a color and brightness of a pixel.

16. The non-transitory computer readable medium having stored therein the computer program for image processing according to claim 14, further causing the computer to execute functions of: number-of-image-frames-designation receiving means for receiving designation of a number of the image frames on which processing by the region-boundary-line automatically generating means is executed; and number-of-frames discriminating means for discriminating whether the number of image frames on which the processing for automatically generating a new region boundary line is executed has reached the designated number of image frames, wherein the computer program for image processing causes the first feature-point receiving means, the second feature-point specifying means, and the region-boundary-line automatically generating means to execute the respective kinds of processing until the number-of-frames discriminating means discriminates that the number of image frames has reached the designated number of image frames.

17. The non-transitory computer readable medium having stored therein the computer program for image processing according to claim 10, the computer program for image processing making it possible to automatically generate, among the plurality of image frames forming the moving image, when a first image frame, in which the depth value is already given to the region surrounded by the first division line, is present, the depth value in a region corresponding to the region surrounded by the first division line in a second image frame that is present later than the first image frame in time series, and the computer program for image processing further causing the computer to execute functions of: pixel-depth-value allocating means for allocating, to one or more first pixels present in the region surrounded by the first division line in the first image frame, the depth value given to the region surrounded by the first division line; pixel-moving-position tracking means for tracking the first pixels to find to which pixels in the second image frame the first pixels move; and depth-value automatically generating means for automatically generating a depth value allocated by the pixel-depth-value allocating means to a region in the second image frame, that is, a region formed by second pixels after the movement of the first pixels.

* * * * *